(12) United States Patent
Aoki et al.

(10) Patent No.: US 10,906,601 B2
(45) Date of Patent: Feb. 2, 2021

(54) PASSENGER VEHICLE

(71) Applicant: Yanmar Co., Ltd., Osaka (JP)

(72) Inventors: Hideaki Aoki, Osaka (JP); Kazuma Moriguchi, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 217 days.

(21) Appl. No.: 15/763,791

(22) PCT Filed: Sep. 9, 2016

(86) PCT No.: PCT/JP2016/076657
§ 371 (c)(1),
(2) Date: Mar. 27, 2018

(87) PCT Pub. No.: WO2017/056926
PCT Pub. Date: Apr. 6, 2017

(65) Prior Publication Data
US 2018/0281878 A1    Oct. 4, 2018

(30) Foreign Application Priority Data
Sep. 28, 2015    (JP) ................................. 2015-190048

(51) Int. Cl.
*B62D 55/116*    (2006.01)
*B62D 55/065*    (2006.01)
(Continued)

(52) U.S. Cl.
CPC ........ *B62D 55/116* (2013.01); *B60G 17/0157* (2013.01); *B60G 17/0165* (2013.01);
(Continued)

(58) Field of Classification Search
CPC .... B62D 1/046; B62D 55/065; B62D 55/116; B62M 27/02; B62M 27/026;
(Continued)

(56) References Cited

U.S. PATENT DOCUMENTS 3,746,118 A * 7/1973 Altorfer ................. B62D 61/06
                                                            180/210
3,806,141 A * 4/1974 Janer ..................... B60G 21/007
                                                            280/6.156
(Continued)

FOREIGN PATENT DOCUMENTS

JP         2529735 B2     9/1996
JP     2004-089150 A     3/2004
(Continued)

OTHER PUBLICATIONS

"Newsletter from Farmland-Water-Environment Conservation Association in Shima-area, Oba-cho, Mito-shi" in Japan regarding a forage rice combine harvester of Yanmar Co., Ltd., having an attitude control system. Retrieved from the Internet: URL http://oba-shima.mito-city.com/2010/08/25/ymcomb/.
(Continued)

*Primary Examiner* — Ruth Ilan
*Assistant Examiner* — Maurice L Williams
(74) *Attorney, Agent, or Firm* — Norton Rose Fulbright US LLP

(57) ABSTRACT

A passenger vehicle provided with a steering handle and configured such that an attitude angle of the driver seat surface relative to a horizontal reference plane is changeable, so that a first attitude changing operation switch and a second attitude changing operation switch for changing the attitude angle are disposed in such positions as to be operable with a thumb of the driver of the vehicle from a steering handle grip of the steering handle.

20 Claims, 21 Drawing Sheets

(51) Int. Cl.
*B62D 1/04* (2006.01)
*B60G 21/05* (2006.01)
*B60G 21/10* (2006.01)
*B60G 21/055* (2006.01)
*B60G 21/00* (2006.01)
*B62K 23/02* (2006.01)
*B62M 27/02* (2006.01)
*B60G 17/0165* (2006.01)
*B60G 17/015* (2006.01)
*B62K 25/04* (2006.01)

(52) U.S. Cl.
CPC ............ *B60G 21/00* (2013.01); *B60G 21/05* (2013.01); *B60G 21/0555* (2013.01); *B60G 21/106* (2013.01); *B62D 1/046* (2013.01); *B62D 55/065* (2013.01); *B62K 23/02* (2013.01); *B62M 27/02* (2013.01); *B60G 2200/132* (2013.01); *B60G 2202/42* (2013.01); *B60G 2202/442* (2013.01); *B60G 2204/421* (2013.01); *B60G 2204/62* (2013.01); *B60G 2204/82* (2013.01); *B60G 2204/8302* (2013.01); *B60G 2300/124* (2013.01); *B60G 2300/27* (2013.01); *B60G 2300/32* (2013.01); *B60G 2300/45* (2013.01); *B60G 2400/0511* (2013.01); *B60G 2400/05162* (2013.01); *B60G 2400/412* (2013.01); *B60G 2600/182* (2013.01); *B60G 2600/20* (2013.01); *B60G 2800/0192* (2013.01); *B62K 2025/044* (2013.01); *B62K 2025/048* (2013.01); *B62M 2027/026* (2013.01)

(58) Field of Classification Search
CPC .......... B60G 2300/322; B60G 2600/20; B60G 21/00; B60G 21/002; B60G 21/005; B60G 21/023; B60G 21/026; B60G 21/05; B60G 21/0555; B60G 21/103; B60G 21/106; B62K 23/02; B62K 23/04; B62K 23/06
See application file for complete search history.

(56) References Cited

U.S. PATENT DOCUMENTS

| | | | | |
|---|---|---|---|---|
| 4,546,997 A * | 10/1985 | Smyers | ............. | B62D 9/02 180/210 |
| 4,792,783 A * | 12/1988 | Burgess | ............. | B60K 35/00 307/10.1 |
| 7,591,337 B2 * | 9/2009 | Suhre | ............. | B60G 3/20 180/210 |
| 7,600,596 B2 * | 10/2009 | Van Den Brink | ....... | B62J 25/00 180/210 |
| 8,141,890 B2 * | 3/2012 | Hughes | ............. | B60G 21/007 280/124.103 |
| 9,022,449 B2 * | 5/2015 | Ishige | ............. | B62K 5/01 296/65.01 |
| 9,428,237 B2 * | 8/2016 | Toftner | ............. | A62B 18/006 |
| 2005/0223839 A1 * | 10/2005 | Crabtree | ............. | B62K 11/14 74/502.2 |
| 2005/0236203 A1 * | 10/2005 | Toftner | ............. | B62J 1/12 180/219 |
| 2006/0079372 A1 * | 4/2006 | Ringger | ............. | B60K 20/06 477/79 |
| 2007/0078577 A1 * | 4/2007 | Coombs | ............. | B62K 23/00 701/36 |
| 2008/0197597 A1 * | 8/2008 | Moulene | ............. | B62D 31/003 280/124.103 |
| 2010/0044977 A1 * | 2/2010 | Hughes | ............. | B60G 21/007 280/5.509 |
| 2011/0006498 A1 * | 1/2011 | Mercier | ............. | B62D 9/02 280/124.103 |
| 2012/0303218 A1 * | 11/2012 | Tamura | ............. | B62D 1/02 701/41 |
| 2013/0068550 A1 * | 3/2013 | Gale | ............. | B60G 7/006 180/216 |
| 2013/0304319 A1 * | 11/2013 | Daniels | ............. | B60G 21/106 701/38 |
| 2014/0238763 A1 * | 8/2014 | Melcher | ............. | B62M 27/02 180/182 |
| 2014/0312580 A1 * | 10/2014 | Gale | ............. | B60G 21/073 280/5.509 |
| 2014/0358369 A1 * | 12/2014 | Anderfaas | ............. | B62K 5/10 701/37 |
| 2015/0082933 A1 * | 3/2015 | Spaggiari | ............. | B60Q 1/343 74/484 R |
| 2015/0142289 A1 * | 5/2015 | Katoh | ............. | B62K 23/08 701/70 |
| 2015/0165856 A1 * | 6/2015 | Horstman | ............. | E02F 3/845 280/6.154 |
| 2015/0273971 A1 * | 10/2015 | Hawksworth | ...... | B60G 17/0272 280/5.515 |
| 2015/0274248 A1 * | 10/2015 | Osanai | ............. | G05G 9/04792 74/471 R |
| 2015/0291241 A1 * | 10/2015 | Takano | ............. | B62K 5/05 280/5.509 |
| 2015/0344059 A1 * | 12/2015 | Kim | ............. | B62D 1/046 74/552 |

FOREIGN PATENT DOCUMENTS

| | | |
|---|---|---|
| JP | 2006-083996 A | 3/2006 |
| JP | 2010-273617 A | 12/2010 |
| JP | 2011-087532 A | 5/2011 |
| JP | 2014-118086 A | 6/2014 |
| JP | 2015-068483 A | 4/2015 |

OTHER PUBLICATIONS

Japanese Office Action dated May 28, 2019 issued in corresponding JP Application 2015-190048 cites the website document above.
International Search Report dated Nov. 1, 2016 issued in corresponding PCT Application PCT/JP2016/076657 cites the patents documents above.

* cited by examiner

PASSENGER VEHICLE

CROSS REFERENCES TO RELATED APPLICATIONS

This application is a national stage application pursuant to 35 U.S.C. § 371 of International Application No. PCT/JP2016/076657, filed on Sep. 9, 2016, which claims priority under 35 U.S.C. § 119 to Japanese Patent Application No. 2015-190048, filed on Sep. 28, 2015, the disclosures of which are hereby incorporated by reference in their entireties.

TECHNICAL FIELD

The present invention relates to a passenger vehicle, and more specifically to a passenger vehicle provided with steering means having a gripper that can be gripped by a driver, the passenger vehicle being configured such that the attitude angle of a driver seat surface relative to a horizontal reference plane is changeable,

BACKGROUND ART

In a passenger vehicle, a configuration is known in which the attitude angle of a driver seat surface relative to a horizontal reference plane is made changeable, for the purpose of improvement in traveling stability and driving operability during traveling in a place having contours or slopes, such as uneven ground.

Patent Literature 1 (hereinafter, PTL 1) discloses a passenger vehicle configured such that the rolling and pitching of its vehicle main body relative to a horizontal reference plane can be controlled, the passenger vehicle having a switching instrument for switching between an automatic mode in which the rolling angle and the pitching angle which constitute the attitude angle are maintained at set angles and a manual mode in which the rolling angle and the pitching angle are changed through instruction means.

A passenger vehicle having a configuration is also known in which operation instruments for operating various devices such as a transmission are disposed at such positions that a driver is able to operate the operation instruments without releasing his/her hand from a steering handle, for the purpose of improvement in the driving operability.

Patent Literature 2 (hereinafter, PTL 2) discloses a passenger vehicle configured such that an operation lever with a switch provided on a back surface thereof is disposed in a spoke part of a steering wheel, for the purpose of enabling a driver to perform a shift operation without releasing his/her hand from the steering wheel.

Patent Literature 3 (hereinafter, PTL 3) discloses a configuration of an all terrain vehicle ATV, in which a throttle lever operable with a right thumb and a travel mode changing switch are disposed around a steering handle whereas an on/off switch for headlamps, an optical axis changing switch, a starter button, a shift-up switch, a shift-down switch, and an engine stop switch are disposed on the left side of the steering handle.

CITATION LIST

Patent Literature

PTL 1: Japanese Patent No. 2529735
PTL 2: Japanese Patent Application Laid-Open No. 2014-118086
PTL 3: Japanese Patent Application Laid-Open No. 2015-68483

SUMMARY OF INVENTION

Technical Problem

When a passenger vehicle travels in a place where slopes continuously appear, some drivers prefer to incline a driver seat surface to the side higher than a horizontal reference plane, that is, to elevate the lower end side of the driver seat surface. It therefore is necessary that an operation instrument for changing the attitude angle of the driver seat surface relative to the horizontal reference plane is disposed so as to be operable without deteriorating the driving operability. In addition, such a passenger vehicle may require that the attitude angle of the driver seat surface be changed, for example, the driver seat surface be inclined to the higher side in advance for overcoming an obstacle on a path when traveling on a slope ground.

In this respect, PTL 1 has no consideration for the operability of the operation instrument for changing the attitude angle of the driver seat surface. PTL 2 and PTL 3 disclose a configuration in which operation instruments for operating various devices are disposed at such positions that they can be operated with a finger without the need of release of a hand from a steering instrument such as a steering handle, but do not disclose arrangement of the operation instrument for changing the attitude angle of the driver seat surface.

The present application proposes a passenger vehicle provided with steering means having a gripper that can be gripped by a driver, the passenger vehicle being configured such that the attitude angle of a driver seat surface relative to a horizontal reference plane is changeable, the passenger vehicle enabling the attitude angle of the driver seat surface to be changed without deteriorating the driving operability.

Solution to Problem

To solve the problems described above, an aspect of the present invention is a passenger vehicle provided with steering means having a gripper that is gripped by a driver, the passenger vehicle being configured such that an attitude angle of a driver seat surface relative to a horizontal reference plane is changeable, wherein
attitude changing operation means for changing the attitude angle is disposed in such a position as to be operable with a thumb from the gripper.

Further, the passenger vehicle may be such that
the attitude changing operation means is a push switch of automatic returning type, and the attitude changing operation means for a right hand and the attitude changing operation means for a left hand are separately provided, and
when the right-hand operation means is pushed, the attitude angle is changed in such a direction that a right end of the driver seat surface is lowered, and when the left-hand operation means is pushed, the attitude angle is changed in such a direction that a left end of the driver seat surface is lowered.

Further, the passenger vehicle may be such that
the attitude changing operation means is a seesaw push switch of automatic returning type, and configured such that:
when a right side portion thereof is pushed, the attitude angle is changed in such a direction that a right end of the driver seat surface is lowered, and when a left side portion thereof is pushed, the attitude angle is changed in such a direction that a left end of the driver seat surface is lowered; or when a front or upper portion thereof is pushed, the attitude angle is changed in such a direction that a front end of the driver seat surface is lowered, and when a rear or lower portion thereof is pushed, the attitude angle is changed in such a direction that a rear end of the driver seat surface is lowered.

Advantageous Effects of Invention

An aspect of the present invention provides a passenger vehicle provided with steering means having a gripper that is gripped by a driver, the passenger vehicle being configured such that an attitude angle of a driver seat surface relative to a horizontal reference plane is changeable, wherein attitude changing operation means for changing the attitude angle is disposed in such a position as to be operable with a thumb from the gripper. Thus, the attitude angle of the driver seat surface can be changed without a deterioration in driving operability.

Further, the passenger vehicle may be such that: the attitude changing operation means is a push switch of automatic returning type, and the attitude changing operation means for a right hand and the attitude changing operation means for a left hand are separately provided; and when the right-hand operation means is pushed, the attitude angle is changed in such a direction that a right end of the driver seat surface is lowered, and when the left-hand operation means is pushed, the attitude angle is changed in such a direction that a left end of the driver seat surface is lowered. This configuration enables a change of the attitude angle of the driver seat surface to be adapted to the driver's perception, which can provide a good operability.

Further, the passenger vehicle may be such that: the attitude changing operation means is a seesaw push switch of automatic returning type, and configured such that:

when a right side portion thereof is pushed, the attitude angle is changed in such a direction that a right end of the driver seat surface is lowered, and when a left side portion thereof is pushed, the attitude angle is changed in such a direction that a left end of the driver seat surface is lowered; or when a front or upper portion thereof is pushed, the attitude angle is changed in such a direction that a front end of the driver seat surface is lowered, and when a rear or lower portion thereof is pushed, the attitude angle is changed in such a direction that a rear end of the driver seat surface is lowered. This configuration enables a change of the attitude angle of the driver seat surface to be adapted to the driver's perception, which can provide a good operability.

BRIEF DESCRIPTION OF DRAWINGS

FIG. 17 An outline diagram showing an exemplary state when the passenger vehicle is traveling across a slope ground, in which
FIG. 18 An outline diagram showing another exemplary state when the passenger vehicle is traveling across a slope ground, in which
FIG. 20 An outline diagram showing an exemplary state when the passenger vehicle according to another embodiment is traveling uphill, in which

DESCRIPTION OF EMBODIMENTS

Figure 1:
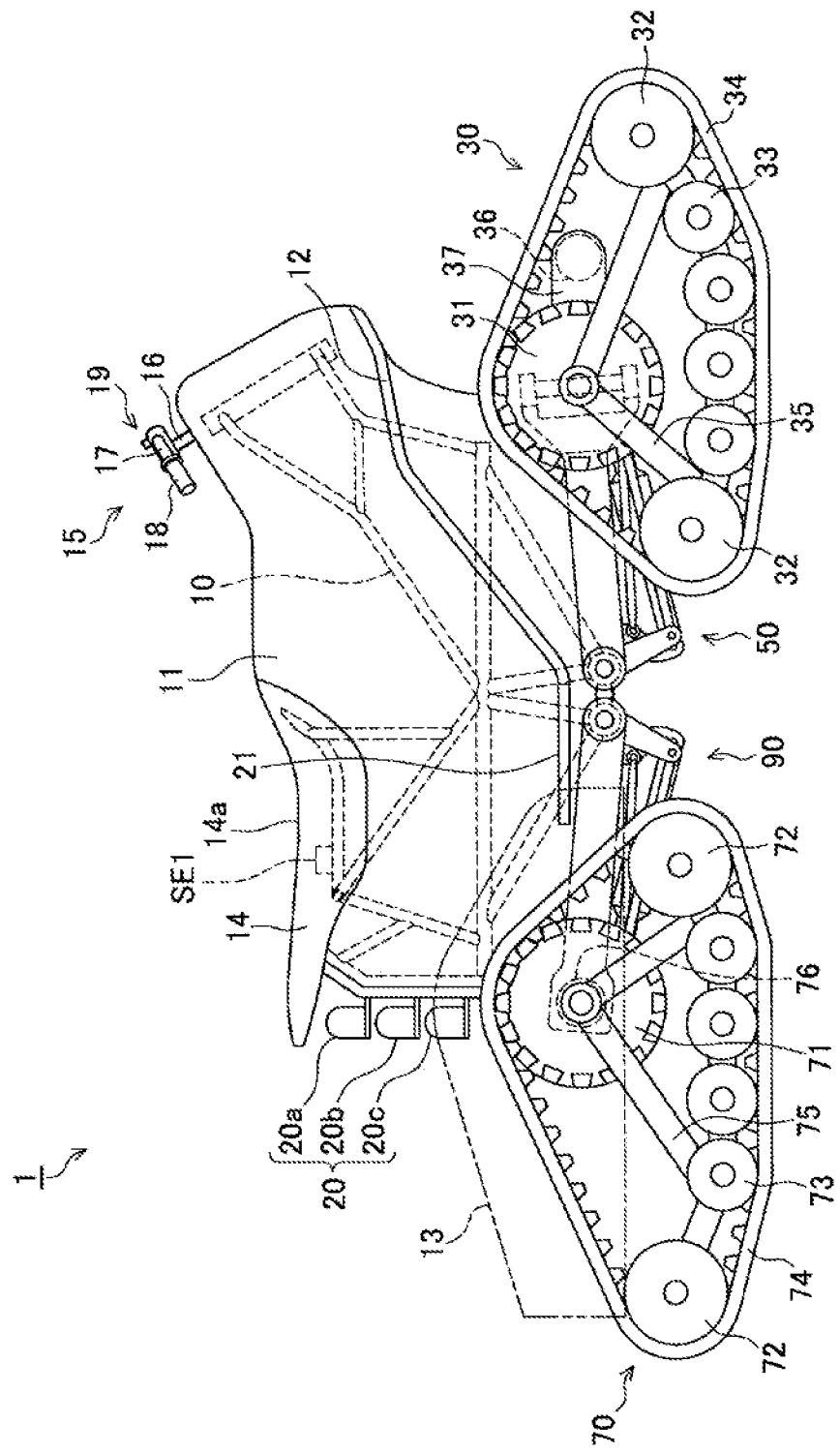
FIG. 1 A side view showing a passenger vehicle as an example of an embodiment of the present invention.
Figure 2:
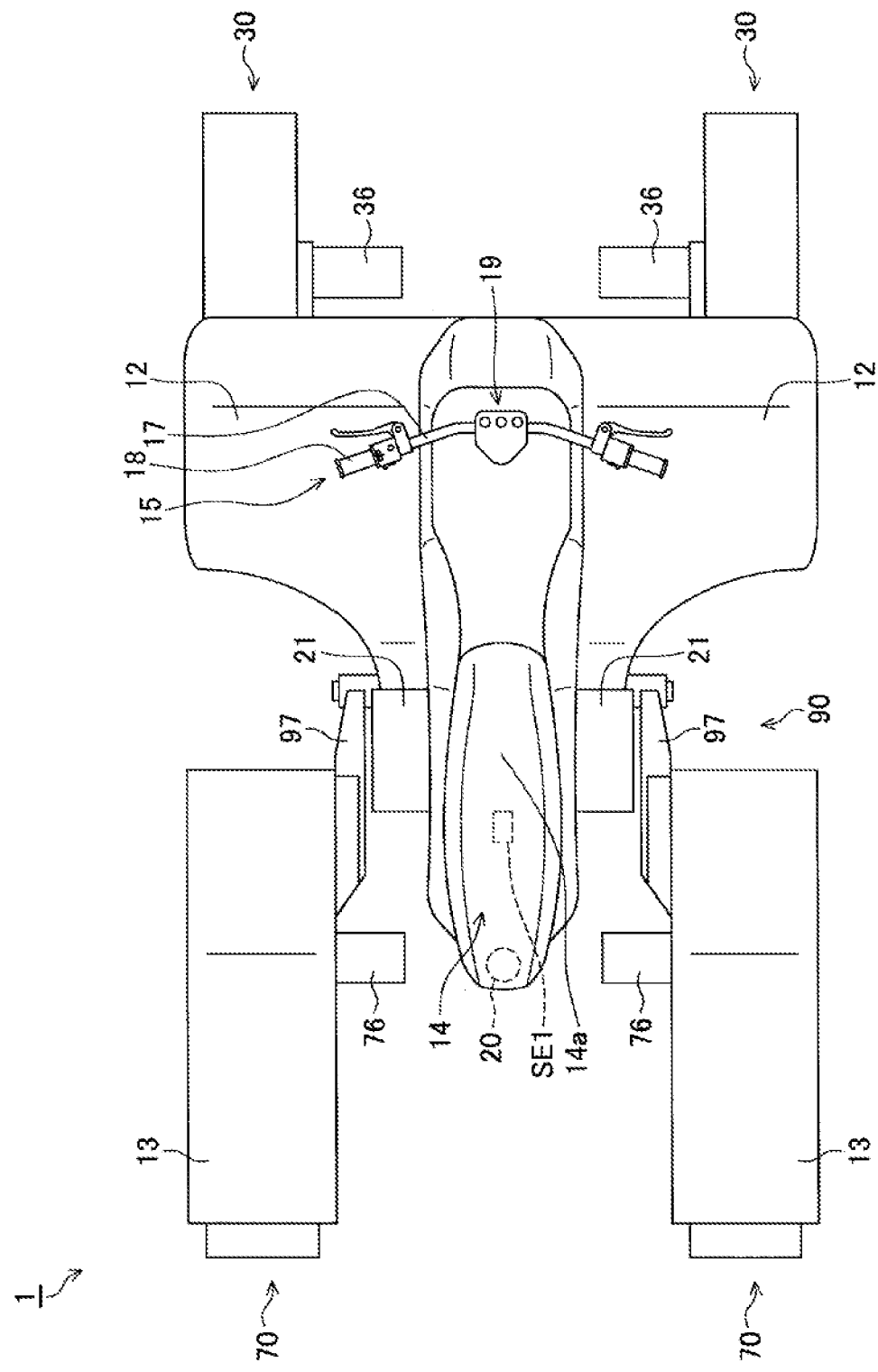
FIG. 2 A plan view of the passenger vehicle of FIG. 1.

In the following, some embodiments of the present invention will be detailed with reference to the drawings. FIG. 1 is a side view showing a passenger vehicle 1 as an example of the embodiment of the present invention, and FIG. 2 is a plan view of the passenger vehicle 1 of FIG. 1. Hereinafter, for the convenience of descriptions, the rightward direction in FIG. 1 which is a traveling direction of the passenger vehicle 1 will be referred to as frontward direction; the directions coming out of and going into the drawing page of FIG. 1 which are horizontal and perpendicular to the traveling direction will be referred to as right and left directions, respectively; and the upper and lower directions in FIG. 1 which are vertical and perpendicular to the traveling direction will be referred to as upward direction and downward direction, respectively.

As shown in FIG. 1 and FIG. 2, the passenger vehicle 1 includes: a vehicle body frame 10 with a driver seat 14 attached thereon; front crawler traveling devices 30, 30 serving as a pair of left and right traveling devices provided frontward; a front suspension 50 that suspends the pair of left and right front crawler traveling devices 30 from the vehicle body frame 10; rear crawler traveling devices 70, 70 serving as a pair of left and right traveling devices provided rearward; and a rear suspension 90 that suspends the pair of left and right rear crawler traveling devices 70 from the vehicle body frame 10. The passenger vehicle 1 also includes, inside the vehicle body frame 10, a battery (not shown) for storing electricity, a control unit (not shown) constituted of a computing unit, a storage unit, and the like, for controlling respective devices, and the like.

The passenger vehicle 1 is configured to change the attitude angle of the vehicle body frame relative to a horizontal reference plane, and more specifically to change the attitude angle of a driver seat surface 14*a* relative to the horizontal reference plane, by actuating the front suspension 50 and the rear suspension 90 to swing up and down the front, rear, left, and right crawler traveling devices 30, 30, 70, 70 relative to the vehicle body frame 10, though details will be given later.

The vehicle body frame 10 is made of a plurality of steel materials such as cylindrical pipes or tabular plates being coupled by welding. The vehicle body frame 10 is covered with a main body cover 11. The main body cover 11 is for covering the vehicle body frame 10. The main body cover 11 has front fenders 12, 12 above the left and right front crawler traveling devices 30, 30. A swing arm 94 of the rear suspension 90 which will be described later has rear fenders 13, 13 that covers top portions of the left and right rear crawler traveling devices 70, 70 from the above.

The driver seat 14 is attached to a top portion of a rear part of the vehicle body frame 10, and the driver seat 14 is supported on the vehicle body frame 10. A steering handle 15 serving as steering means is provided in front of the driver seat 14. The steering handle 15 includes a steering shaft 16, a steering handlebar 17 provided at the upper end of the steering shaft 16, and the like, the steering handlebar 17 protruding outward in the lateral (left-right) direction. The steering shaft 16 is supported on the vehicle body frame 10 in a freely rotatable manner, and coupled to a steering mechanism (not shown). The steering handlebar 17 has, in left and right end portions thereof, steering handle grips 18, 18 serving as a gripper griped by a driver.

A first indicator 19 is provided in a laterally central portion of the steering handlebar 17. A second indicator 20 fixed to the vehicle body frame 10 is provided below a rear portion of the driver seat 14. The first indicator 19 and the second indicator 20 are, though details will be given later, configured to make a display corresponding to an attitude control mode status of the passenger vehicle 1 which will be described later, a warning display for warning of an abnormality.

Below the driver seat 14, left and right step floors 21, 21 are provided between the front crawler traveling devices 30, 30 and the rear crawler traveling devices 70, 70. The left and right step floors 21, 21 are fixed to the vehicle body frame 10. The passenger vehicle 1 is a straddle type passenger vehicle, on which a driver rides while straddling the driver seat 14 with the feet on the left and right step floors 21, 21 and gripping the left and right steering handle grips 18, 18. The driver is seated on the driver seat surface 14*a* which is a substantially horizontal surface provided on a top portion of the driver seat 14. At the rear of the driver seat 14, a member protruding upward beyond the driver seat surface 14*a*, as exemplified by a backrest, is not provided. At the rear of the step floors 21, 21, a member protruding upward beyond the step floors 21, 21 is not provided, either. A space is formed that allows the driver to move from the riding posture to a position between the left and right rear crawler traveling devices 70, 70 at the rear of the vehicle body frame 10. Thus, the passenger vehicle 1 is configured such that the driver can get into or out of the vehicle from the sides or from behind.

The vehicle body frame 10 is provided therein with an attitude angle sensor SE1 that detects the attitude angle of the vehicle body frame 10 relative to the horizontal reference plane, which is the attitude angle of the driver seat surface 14*a* relative to the horizontal reference plane. The attitude angle sensor SE1 is disposed on a laterally central line of the driver seat 14 and near a position below the driver seat 14. The attitude angle includes the roll angle of a lateral inclination of the driver seat surface 14*a*, and the pitch angle of the longitudinal (front-rear) inclination. The attitude angle sensor SE1 may be a sensor that detects inclinations in all directions, or may be a combination of a sensor that detects the roll angle and a sensor that detects the pitch angle. The sensor type is not particularly limited, and for example, a gyro sensor is adopted. No limitation is put on the arrangement of the attitude angle sensor SE1 and the number of the attitude angle sensors SE1.

The front crawler traveling devices 30 serving as the pair of left and right traveling devices will now be detailed. Since the left and right front crawler traveling devices 30 are laterally symmetrical, the right front crawler traveling device 30 will be described. A description of a configuration of the left front crawler traveling device 30 is omitted.

The front crawler traveling device 30 includes: a drive wheel 31 provided in a top portion of the front crawler traveling device 30; driven wheels 32 provided below the drive wheel 31 and disposed in front and rear portions of the front crawler traveling device 30; four auxiliary rollers 33 provided between the two driven wheels 32; a crawler belt 34; a mount frame 35; a motor 36 serving as a driving unit for driving the crawler traveling device; and a gear case 37, etc. The crawler belt 34 is put over the drive wheel 31, the two driven wheels 32, and the four auxiliary rollers 33 so as to circumscribe them. The drive wheel 31, the two driven wheels 32, and the four auxiliary rollers 33 are turnably supported on the mount frame 35. The motor 36 and the gear case 37 are located on the vehicle inner side of the mount frame 35, and configured such that a driving force of the motor 36 is transmitted to the drive wheel 31 via the gear case 37, to drive the front crawler traveling device 30.

The front crawler traveling device 30 is coupled to the front suspension 50 which will be described later with a bracket (not shown) interposed therebetween such that the front crawler traveling device 30 is laterally rotatable about an axis extending in the vertical (up-down) direction. The steering mechanism coupled to the steering shaft 16 is also coupled to the left and right crawler traveling devices 30. That is, the left and right crawler traveling devices 30 are interlockingly coupled to the steering handle 15 via the steering mechanism. Operating the steering handle 15 causes the left and right front crawler traveling devices 30 to rotate laterally, thus implementing a steering operation of the passenger vehicle 1. The mount frame 35 is swingable relative to the gear case 37 in the longitudinal (front-rear) direction about a rotation axis of the drive wheel 31. Thus, the front crawler traveling device 30 is swingable relative to the front suspension 50 in the longitudinal direction about the rotation axis of the drive wheel 31.

The front crawler traveling device 30 also includes: a tension adjustment device (not shown) that adjusts a tension of the crawler belt 34 by moving the position of the driven wheels 32 relative to the mount frame 35; a brake device (not shown) that stops turning of the drive wheel 31; and a buffer mechanism that suppresses the longitudinal swinging of the front crawler traveling device 30 about the rotation axis of the drive wheel 31, etc. The buffer mechanism, which is provided between the mount frame 35 and the gear case 37, allows the front crawler traveling device 30 to be grounded with stability, and serves to improve the traveling performance and rider's comfort. The buffer mechanism also serves to reduce a load, such as distortion and impact, which may be applied to a portion where the front crawler traveling device 30 is coupled to the front suspension 50 when the front crawler traveling device 30 contacts unevenness of an uneven ground, thus providing an improved durability.

The pair of left and right rear crawler traveling devices 70 serving as the traveling devices will now be detailed. Since the left and right rear crawler traveling devices 70 are laterally symmetrical, the right rear crawler traveling device 70 will be described. A description of a configuration of the left rear crawler traveling device 70 is omitted. The rear crawler traveling device 70 is identical to the front crawler traveling device 30, except that a configuration of coupling with the rear suspension 90 which will be described later is different from a configuration of coupling between the front crawler traveling device 30 and the front suspension 50 described above. Thus, descriptions of the same configuration as that of the front crawler traveling device 30 are omitted as appropriate.

Similarly to the front crawler traveling device 30 described above, the rear crawler traveling device 70 includes: a drive wheel 71 provided in a top portion of the rear crawler traveling device 70; driven wheels 72 provided below the drive wheel 71 and disposed in front and rear portions of the rear crawler traveling device 70; four auxiliary rollers 73 provided between the two driven wheels 72; a crawler belt 74; a mount frame 75; and a motor 76 serving as a driving unit for driving the crawler traveling device, etc.

The motor 76 is located on the vehicle inner side of the mount frame 75, and secured to the swing arm 94 (a flange portion 110 of a first arm 97) of the rear suspension 90 which will be described later. The motor 76 and the drive wheel 71 are coupled to each other, and the rear crawler traveling device 70 is driven by the motor 76 turning the drive wheel 71. The mount frame 75 is swingable in the longitudinal direction about a rotation axis of the drive wheel 71. The rotation axis of the drive wheel 71 is coaxial with a drive shaft of the motor 76. Thus, the rear crawler traveling device 70 is coupled to the rear suspension 90 so as to be swingable in the longitudinal direction about the rotation axis of the drive wheel 71.

Here, similarly to the front crawler traveling device 30 described above, the rear crawler traveling device 70 includes: a tension adjustment device (not shown) that adjusts a tension of the crawler belt 74 by moving the position of the driven wheels 72 relative to the mount frame 75; a brake device (not shown) that stops turning of the drive wheel 71; and a buffer mechanism that suppresses the longitudinal swinging of the rear crawler traveling device 70 about the rotation axis of the drive wheel 71, etc. The buffer mechanism, which is provided between the mount frame 75 and the swing arm 94 of the rear suspension 90 which will be described later, allows the rear crawler traveling device 70 to be grounded with stability, and serves to improve the traveling performance and rider's comfort. The buffer mechanism also serves to reduce a load, such as distortion and impact, which may be applied to a portion where the rear crawler traveling device 70 is coupled to the rear suspension 90 when the rear crawler traveling device 70 contacts unevenness of an uneven ground, thus providing an improved durability.

The motors 36, 76 serving as the driving units for driving the front and rear crawler traveling devices 30, 70 are electric motors that are driven with electric power of the battery, and controlled by the control unit. Transmission of electricity (electric power) from the battery to the motors 36, 76 and transmission of a control signal from the control unit are implemented through a flexible wire harness having a flexibility. Driving the motors 36, 76 with electric power of the battery causes the front and rear crawler traveling devices 30, 70 to drive, thus enabling the passenger vehicle 1 to travel.

The motors 36, 76 serving as the driving units for driving the front and rear crawler traveling devices 30, 70 are provided in the front and rear crawler traveling devices 30, 70, respectively. It therefore is not necessary to provide a transmission mechanism such as a driving shaft between the vehicle body frame 10 and the front and rear crawler traveling devices 30, 70, so that a configuration for transmitting the driving force can be simplified, which can reduce the number of parts and provide good productivity and maintainability.

The motors 36, 76 serving as the driving units for driving the front and rear crawler traveling devices 30, 70 are not limited to electric motors, and they may be, for example, hydraulic motor driven with a fluid pressure. The traveling device of the passenger vehicle 1 is not limited to a crawler type traveling device, and it may be a wheel type traveling device.

Figure 3:
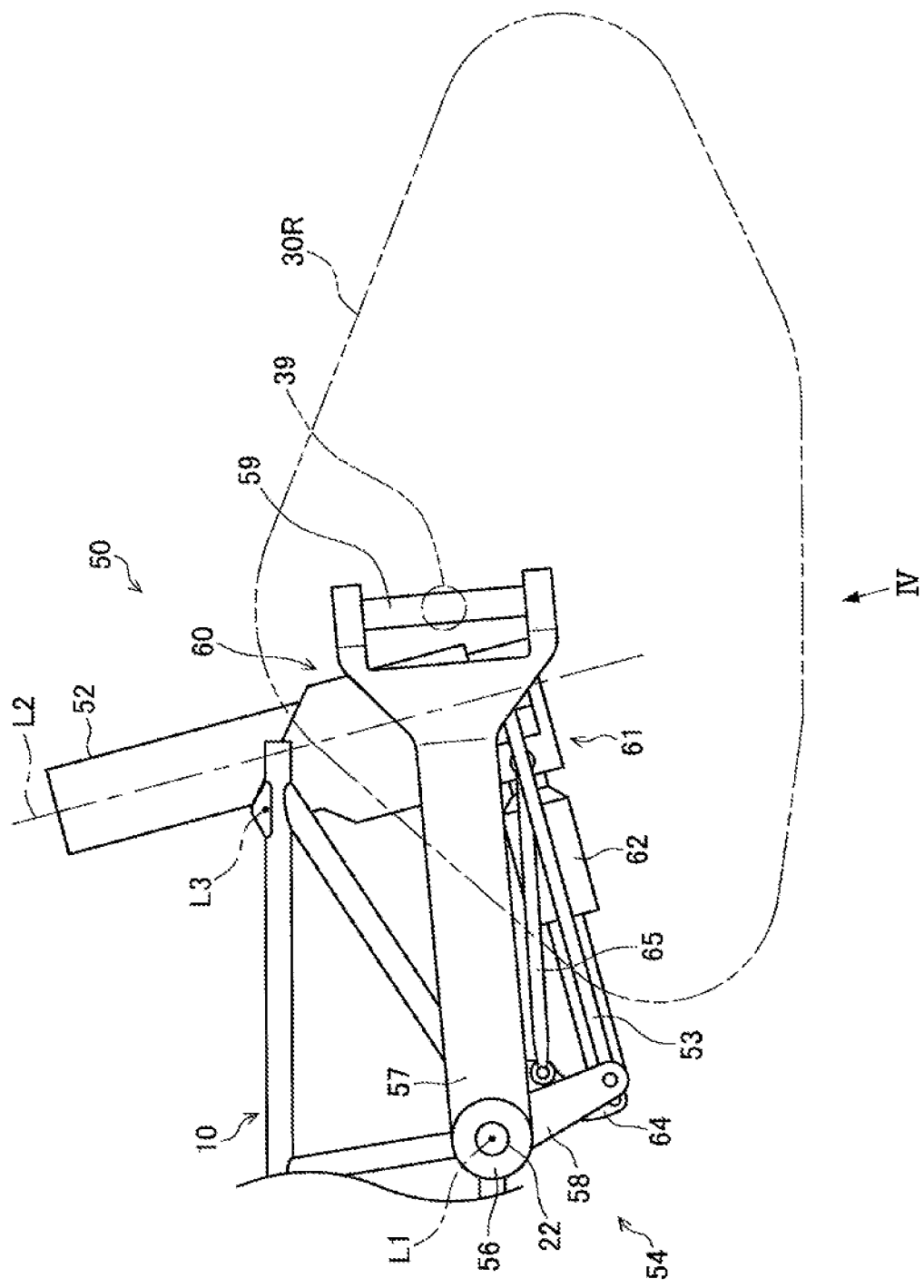
FIG. 3 A side view of a front suspension.
Figure 4:
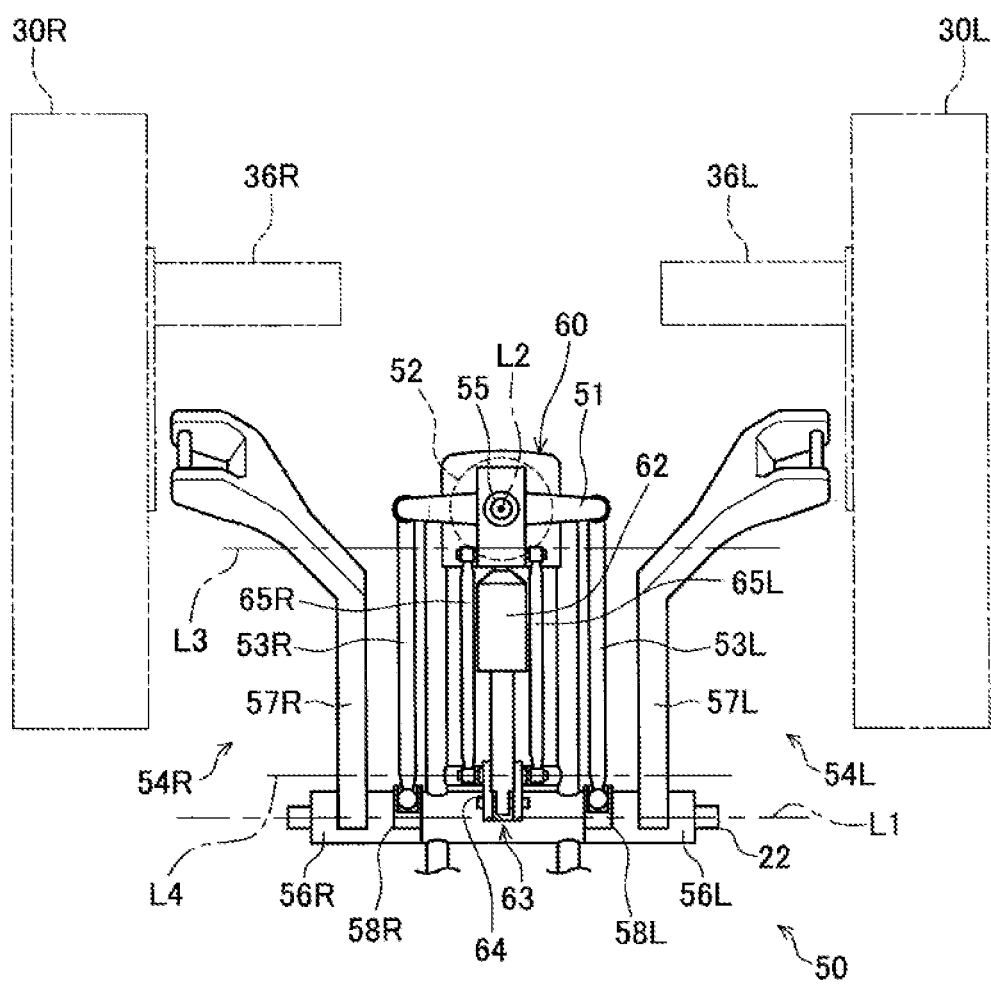
FIG. 4 A view in the direction of the arrow IV of FIG. 3.
Figure 5:
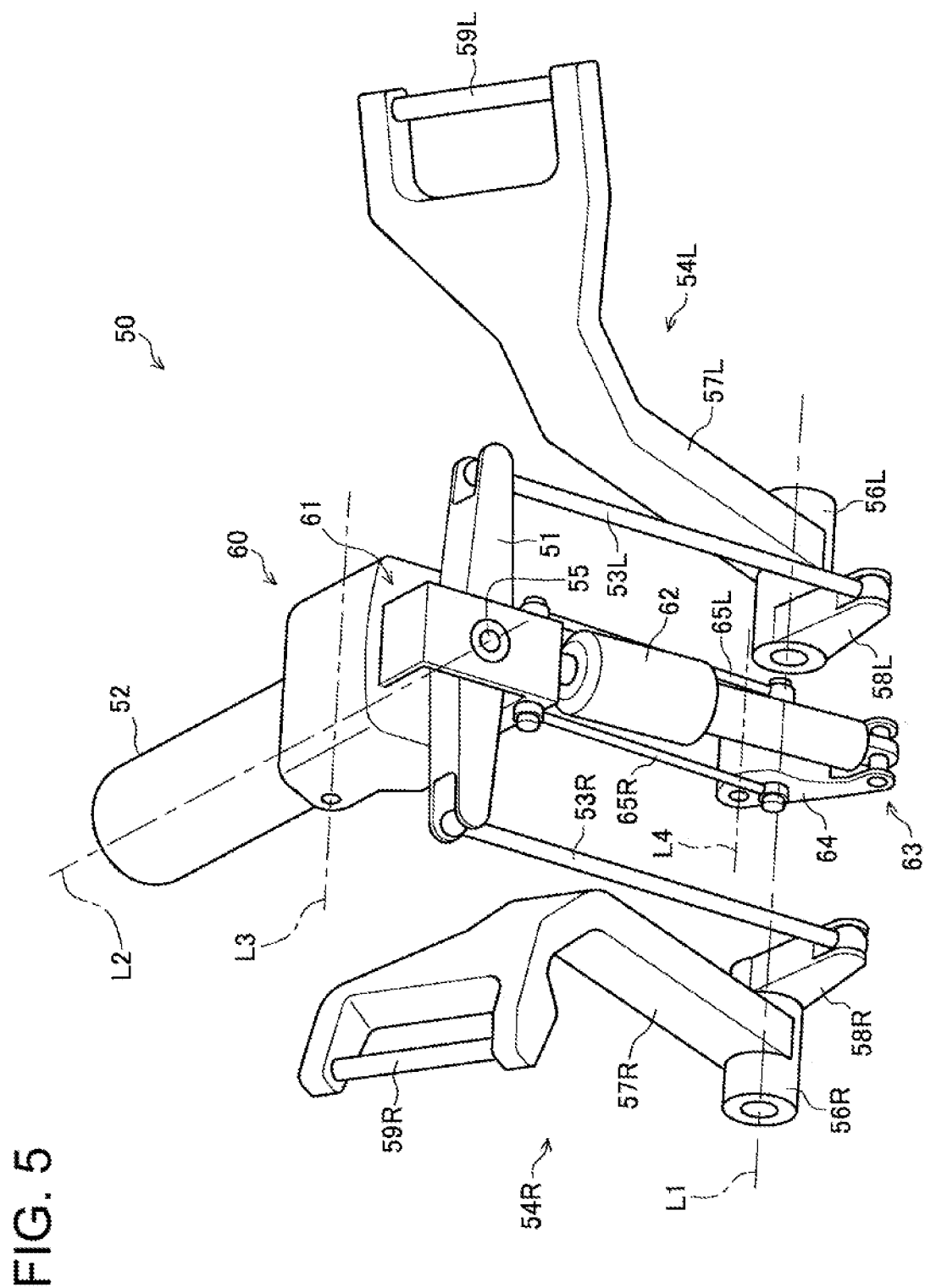
FIG. 5 A perspective view of the front suspension.

The front suspension 50 will now be detailed. Since the front suspension 50 has a laterally symmetrical shape, a member constituting a right part thereof and a member constituting a left part thereof are respectively labelled R and L, as appropriate. FIG. 3 is a side view of the front suspension 50. FIG. 4 is a view in the direction of the arrow IV of FIG. 3. FIG. 5 is a front perspective view of the front suspension 50 as viewed from obliquely below.

As shown in FIGS. 3 to 5, the front suspension 50 includes: a rotary arm 51; a motor 52 serving as a rotary device for rotating the rotary arm 51; a motor case 60 serving as a swing support unit; a pair of left and right coupling arms 53 (53R, 53L); a pair of left and right swing arms 54 (54R, 54L); and a damper 62 serving as a buffer mechanism, etc. In FIG. 5, illustration of the vehicle body frame 10 is omitted. In FIGS. 3 to 5, the straight line L1 is a straight line passing through the center of swinging of the swing arm 54; the straight line L2 is a straight line passing through the center of rotation of the rotary arm 51; the straight line L3 is a straight line passing through the center of swinging of the motor case 60; and the straight line L4 is a straight line passing through the center of swinging of a rocker arm 64.

The motor case 60 is a housing in the shape of a substantially square bottomed tube, in which the motor 52 is disposed with the drive shaft oriented downward. The motor case 60 is provided on a bottom wall thereof with a bracket 61 having a U-like shape in a side view. A through hole extending in the lateral direction is formed in a rear top portion of the motor case 60, and a support shaft (not shown) extending in the lateral direction which is provided in a top front portion of the vehicle body frame 10 is inserted through the through hole. The motor case 60 is supported on the vehicle body frame 10 so as to be freely swingable up and down about a lateral axis (straight line L3). The motor case 60 is disposed with a top portion thereof inclined rearward.

The rotary arm 51, which is a rectangular columnar member extending in the lateral direction, has a rotation shaft 55 at the lateral center thereof. The rotary arm 51 is supported on the bottom wall of the motor case 60 by the bracket 61 so as to be turnable about the rotation shaft 55 (straight line L2). That is, the rotary arm 51 is supported on the motor case 60 so as to be freely rotatable about a substantially vertical axis. The rotation shaft 55 is perpendicular to the bottom wall of the motor case 60, and the rotation shaft 55 is inclined in the longitudinal direction.

The bottom wall of the motor case 60 has a through hole (not shown), and the drive shaft of the motor 52 is coupled to the rotation shaft 55 of the rotary arm 51 via a transmission (not shown) having a gear and the like. The motor 52 is configured to rotate the rotary arm 51 about the rotation shaft 55 (straight line L2).

Here, the motor 52 is an electric motor that is driven with electric power of the battery, and controlled by the control unit. The device for rotating the rotary arm 51 is not limited to an electric motor as long as it is able to rotate the rotary arm 51 through a predetermined angle in a predetermined turning direction, and the device may be, for example, a hydraulic motor that is driven with a fluid pressure.

The coupling arm 53 (53R, 53L) is a circular columnar member. The right coupling arm 53R has one end thereof coupled to a right end portion of the rotary arm 51 via a ball joint serving as a universal joint, and the other end thereof coupled to the right swing arm 54R via a ball joint serving as a universal joint.

The left coupling arm 53L, similarly to the right coupling arm 53R described above, has one end thereof coupled to a left end portion of the rotary arm 51 via a ball joint serving as a universal joint, and the other end thereof coupled to the left swing arm 54L via a ball joint serving as a universal joint.

The swing arm 54 (54R, 54L) includes a support portion 56, a first arm 57, a second arm 58, and the like. The swing arm 54, in which the first arm 57 and the second arm 58 extend from the support portion 56, has a substantially L-like shape in a side view. The support portion 56, which has a cylindrical shape extending in the lateral direction, is supported on a rotation shaft 22 so as to be freely rotatable, the rotation shaft 22 extending in the lateral direction and disposed below at the substantially longitudinal center of the vehicle body frame 10.

The first arm 57 is a rod-like member extending frontward from the outer periphery of the support portion 56, and the front crawler traveling device 30 is coupled to an end portion of the first arm 57. The end portion of the first arm 57 is bifurcated into upper and lower portions, between which a rotation shaft 59 is secured. The front crawler traveling device 30 described above is coupled to the swing arm 54 so as to be laterally rotatable about the rotation shaft 59. The rotation shaft 59 passes through the center of the rotation axis of the drive wheel 31 of the front crawler traveling device 30 in a side view.

The second arm 58 is a rod-like member extending downward from the outer periphery of the support portion 56, and one end of the coupling arm 53 is coupled to an end portion of the second arm 58 via a ball joint serving as a universal joint. The second arm 58 is disposed inner in the vehicle than the first arm 57 is. The length of the second arm 58 is smaller than the length of the first arm 57. The swing arm 54 is supported on the vehicle body frame 10 by the support portion 56 so as to be freely swingable up and down about a lateral axis (straight line L1). The swing arm 54 is configured such that the front crawler traveling device 30 is coupled thereto by the first arm 57 and one end of the coupling arm 53 is coupled thereto by the second arm 58.

The damper 62, which is a rod-like stretchable buffer mechanism made of a cylinder or the like, is disposed at the lateral center of the vehicle body frame 10 so as to extend in the longitudinal direction. The damper 62 has one end thereof coupled to the bracket 61 so as to be freely rotatable about a lateral axis. The damper 62 has the other end thereof coupled to the rocker arm 64 of a link mechanism 63. The damper 62 is configured such that the one end thereof is coupled to the motor case 60 serving as the swing support unit and the other end thereof is coupled to the vehicle body frame 10 via the link mechanism 63.

The link mechanism 63 includes the rocker arm 64 and a pair of left and right pull rods 65 (65R, 65L). The upper end of the rocker arm 64 is supported on a rocker shaft (not shown) so as to be freely rotatable, the rocker shaft extending in the lateral direction and disposed below the substantially longitudinal center of the vehicle body frame 10. The other end of the damper 62 is coupled to the lower end of the rocker arm 64 so as to be freely rotatable about a lateral axis.

The pair of left and right pull rods 65 (65R, 65L) are symmetrically disposed on the left and right sides of the rocker arm 64. The pull rod 65 has one end thereof coupled to a portion between the upper end and the lower end of the rocker arm 64 so as to be freely rotatable about a lateral axis. The pull rod 65 has the other end thereof coupled to the bracket 61 so as to be freely rotatable about a lateral axis. Here, the axis of rotation of the pull rod 65 on the bracket 61 is coaxial with the axis of rotation of the damper 62 on the bracket 61. That is, the damper 62 and the pull rod 65 are coupled coaxially with the bracket 61. The damper 62 disposed in the above-described manner is able to buffer an impact occurring between the vehicle body frame 10 and the left and right front crawler traveling devices 30.

For example, due to a ground swell or the like, an upward and rearward impact load is applied to the front crawler traveling device 30 in forward traveling. At this time, the impact load causes the left and right crawler traveling devices 30 to swing upward about the rotation shaft 22 (straight line L1). Along with the swinging of the left and right crawler traveling devices 30, the left and right swing arms 54 swing upward.

The upward swinging of the left and right swing arms 54 causes the left and right coupling arms 53 to move frontward. The frontward movement of the left and right coupling arms 53 pushes the rotary arm 51 frontward without rotating the rotary arm 51 about the rotation shaft 55 (straight line L2). The frontward pushing of the rotary arm 51 causes the motor case 60 having the rotary arm 51 supported thereon to swing frontward and upward about the support shaft (straight line L3). The damper 62 coupled to the motor case 60 is pulled frontward.

Here, the other end of the damper 62 is coupled to the link mechanism 63. Since each of the left and right pull rods 65 of the link mechanism 63 has one end thereof coupled to the motor case 60, upward swinging of the motor case 60 causes the left and right pull rods 65 to move frontward. The frontward movement of the left and right pull rods 65 causes the rocker arm 64 to swing frontward and upward about the rocker shaft (straight line L4). Thus, the damper 62 coupled to an end portion of the rocker arm 64 is pushed frontward. As a result, the front end (portion coupled to the motor case 60) of the damper 62 is pulled frontward, while the rear end (portion coupled to the rocker arm 64) of the damper 62 is pushed frontward.

Each of the left and right pull rods 65 exerting a force on the rear end of the damper 62 has one end thereof coupled to the motor case 60 which is coaxial with the front end of the damper 62, and the other end thereof coupled to the portion between the upper end and the lower end of the rocker arm 64. Thus, the distance from the center of swinging of the rocker arm 64 (straight line L4) to a portion where the rocker arm 64 is coupled to the damper 62 is greater than the distance from the center of swinging of the rocker arm 64 (straight line L4) to a portion where the rocker arm 64 is coupled to each of the left and right pull rods 65. Moreover, one end of each of the left and right pull rods 65 and one end of the damper 62 are coupled to the motor case 60 which is coaxial therewith. The damper 62 is configured to retract when the left and right crawler traveling devices 30R, 30L swing upward. Accordingly, the damper 62 buffers a force exerted in a retraction direction, to buffer an impact occurring when the left and right crawler traveling devices 30 swing upward. The configuration of the damper 62 is not limited to the above-described one, as long as it is configured to buffer an impact occurring between the vehicle body frame 10 and the left and right front crawler traveling devices 30.

The front suspension 50 includes, as sensors for detecting an actuation state thereof, a rotary arm angle sensor SE2 (not shown herein) for detecting a rotation angle of the rotary arm 51 relative to the vehicle body frame 10 (motor case 60), a swing arm angle sensor SE3 (not shown herein) for detecting rotation angles of the respective left and right swing arms 54R, 54L relative to the vehicle body frame 10 (rotation shaft 22), and the like, though details will be given later. The type of the sensor is not particularly limited, and it may be, for example, a potentiometer or an encoder.

Figure 6:
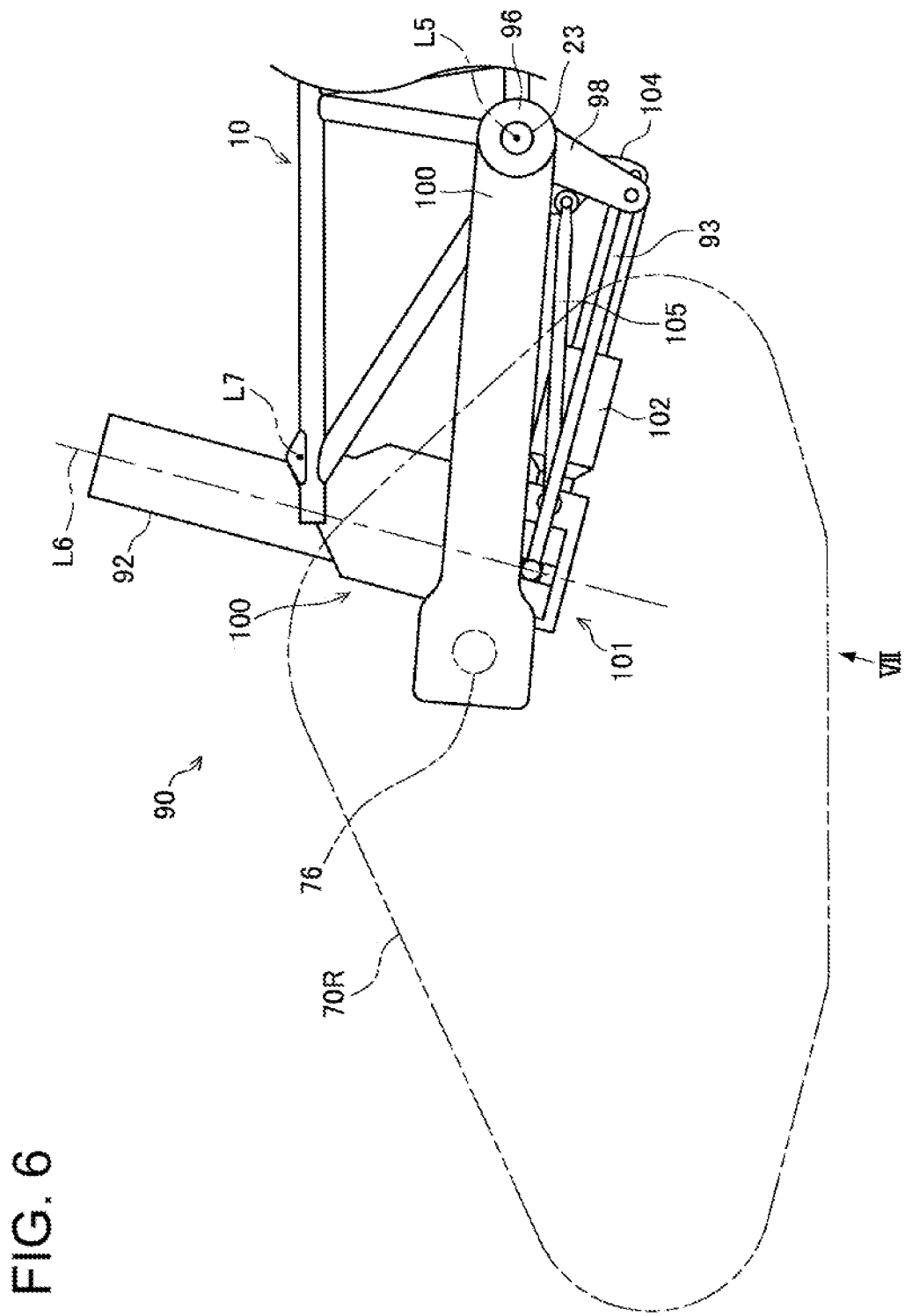
FIG. 6 A side view of a rear suspension.
Figure 7:
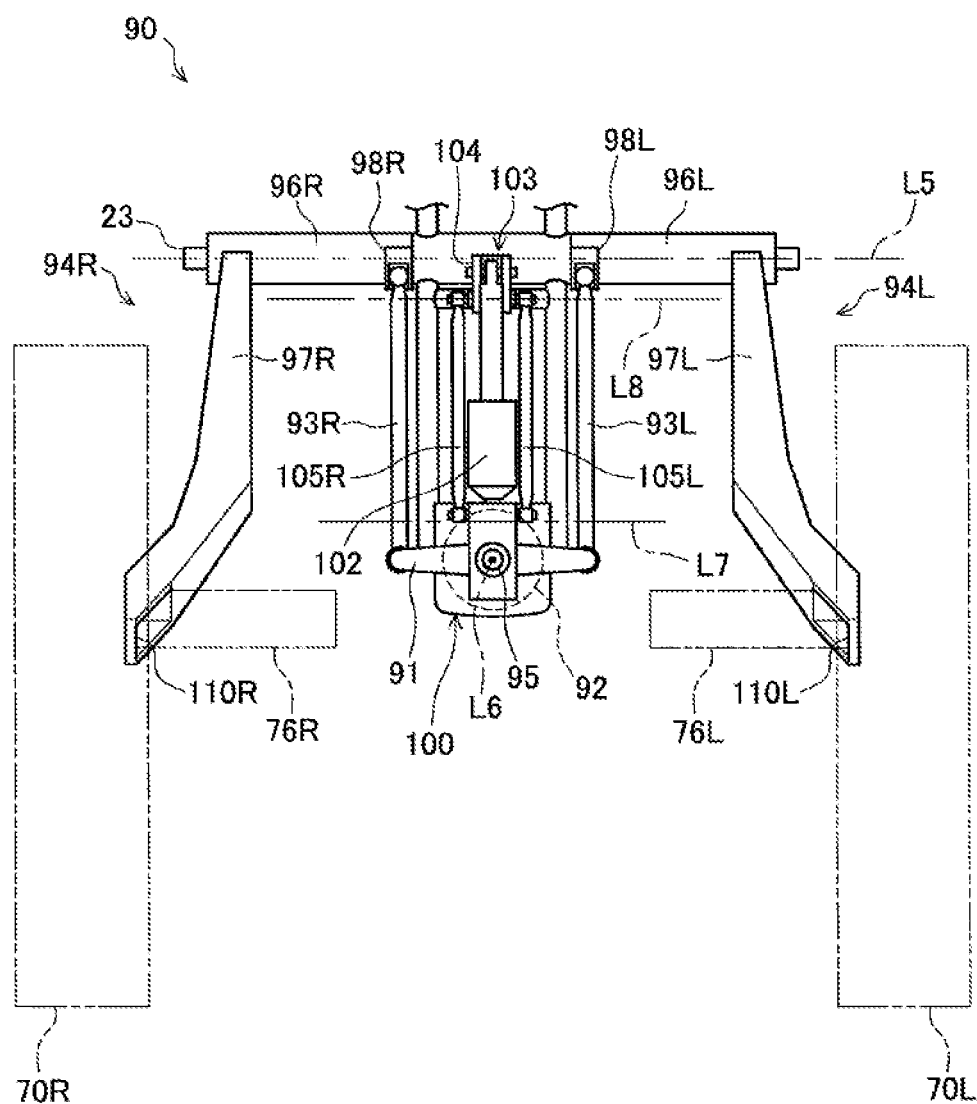
FIG. 7 A view in the direction of the arrow VII of FIG. 6.

The rear suspension 90 will now be detailed. Since the rear suspension 90 has a laterally symmetrical shape, a member constituting a right part thereof and a member constituting a left part thereof are respectively labelled R and L, as appropriate. FIG. 6 is a right side view of the rear suspension 90. FIG. 7 is a view in the direction of the arrow VII of FIG. 6.

As shown in FIGS. 6 and 7, the rear suspension 90 includes: a rotary arm 91; a motor 92 serving as a rotary device for rotating the rotary arm 91; a motor case 100 serving as a swing support unit; a pair of left and right coupling arms 93 (93R, 93L); a pair of left and right swing arms 94 (94R, 94L); and a damper 102 serving as a buffer mechanism, etc. In FIGS. 6 and 7, the straight line L5 is a straight line passing through the center of swinging of the swing arm 94; the straight line L6 is a straight line passing through the center of rotation of the rotary arm 91; the straight line L7 is a straight line passing through the center of swinging of the motor case 100; and the straight line L8 is a straight line passing through the center of swinging of a rocker arm 104.

The configuration of the rear suspension 90 is longitudinally symmetrical with the configuration of the front suspension 50 described above relative to the straight line L1, except for the shape of the swing arm 94. Descriptions of parts identical to those of the front suspension 50 are omitted as appropriate. Of the swing arm 94 of the rear suspension 90, the first arm 97 is different from the first arm 57 of the swing arm 54 of the front suspension 50 in terms of the shape of an end portion.

The motor case 100 is supported so as to be freely swingable up and down about a support shaft (not shown) (straight line L7) extending in the lateral direction which is provided in a top rear portion of the vehicle body frame 10. The rotary arm 91 is supported on a bracket 101 so as to be freely rotatable about a rotation shaft 95 (straight line L6), the bracket 101 provided on a bottom wall of the motor case 100.

The motor 92 is fixed in the motor case 100. A drive shaft (not shown) of the motor 92 is coupled to the rotation shaft 95 of the rotary arm 91 via a transmission (not shown) having a gear and the like. The motor 92 is configured to rotate the rotary arm 91 about the rotation shaft 95 (straight line L6).

The coupling arm 93 has one end thereof coupled to the rotary arm 91 via a ball joint. The coupling arm 93 has the other end thereof coupled to the swing arm 94 via a ball joint. The swing arm 94, in which the first arm 97 and a second arm 98 extend from a support portion 96, has a substantially L-like shape in a side view. The support portion 96, which has a cylindrical shape extending in the lateral direction, is supported on a rotation shaft 23 so as to be freely rotatable, the rotation shaft 23 extending in the lateral direction and disposed below the substantially longitudinal center of the vehicle body frame 10. The first arm 97 is a rod-like member extending rearward from the outer periphery of the support portion 96, and a flange portion 110 having a vertical flat surface is formed in an end portion of the first arm 97. The motor 76 of the rear crawler traveling device 70 is secured to a surface of the flange portion 110 on the vehicle inner side, and the rear crawler traveling device 70 is coupled to the end portion of the first arm 97. The rear fender 13 (not shown herein) is fixed to the first arm 97.

The second arm 98 is a rod-like member extending downward from the outer periphery of the support portion 96, and one end of the coupling arm 93 is coupled to an end portion of the second arm 98 via a ball joint serving as a universal joint. The swing arm 94 is supported on the vehicle body frame 10 by the support portion 96 so as to be freely swingable up and down about a lateral axis (straight line L5). The swing arm 94 is configured such that the rear crawler traveling device 70 is coupled to the first arm 97 and the one end of the coupling arm 93 is coupled to the second arm 98. The rear fender 13 is configured to swing integrally with the swing arm 94.

The rear suspension 90 includes the damper 102 that buffers an impact occurring between the vehicle body frame 10 and the left and right rear crawler traveling devices 70, and a link mechanism 103. The link mechanism 103 includes the rocker arm 104 and a pair of left and right pull rods 105 (105R, 105L). The damper 102 has one end thereof coupled to the bracket 101 so as to be freely rotatable about a lateral axis. The damper 102 has the other end thereof coupled to the rocker arm 104. The upper end of the rocker arm 104 is supported on a rocker shaft (not shown) so as to be freely rotatable, the rocker shaft extending in the lateral direction and disposed below the substantially longitudinal center of the vehicle body frame 10. The rocker arm 104 is supported so as to be freely swingable about the rocker shaft (straight line L8). The other end of the damper 102 is coupled to the lower end of the rocker arm 104 so as to be freely rotatable about a lateral axis. The pull rod 105 has one end thereof coupled to a portion between the upper end and the lower end of the rocker arm 104 so as to be freely rotatable about a lateral axis. The pull rod 105 has the other end thereof coupled to the bracket 101 so as to be freely rotatable about a lateral axis. Here, the damper 102 and the pull rod 105 are coupled coaxially with the bracket 101. The damper 102, similarly to the damper 62 of the front suspension 50 described above, is configured to buffer an impact occurring between the vehicle body frame 10 and the left and right rear crawler traveling devices 70.

Similarly to the front suspension 50, the rear suspension 90 includes, as sensors for detecting an actuation state thereof, a rotary arm angle sensor SE4 (not shown herein) for detecting a rotation angle of the rotary arm 91 relative to the vehicle body frame 10 (motor case 100), a swing arm angle sensor SE5 (not shown herein) for detecting rotation angles of the respective left and right swing arms 94R, 94L relative to the vehicle body frame 10 (rotation shaft 23), and the like.

Figure 8:
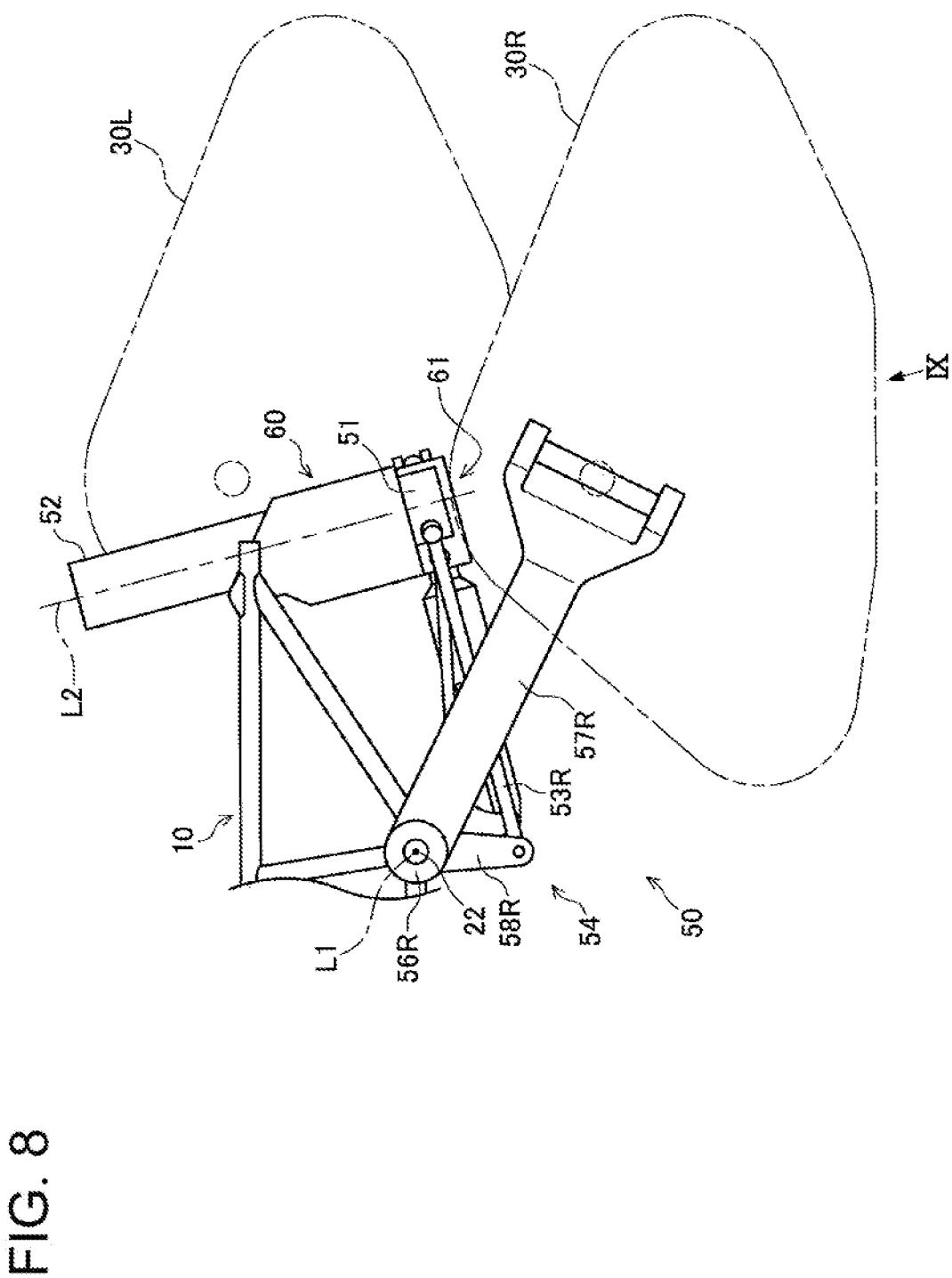
FIG. 8 A side view explanatory of an actuation state of the front suspension.
Figure 9:
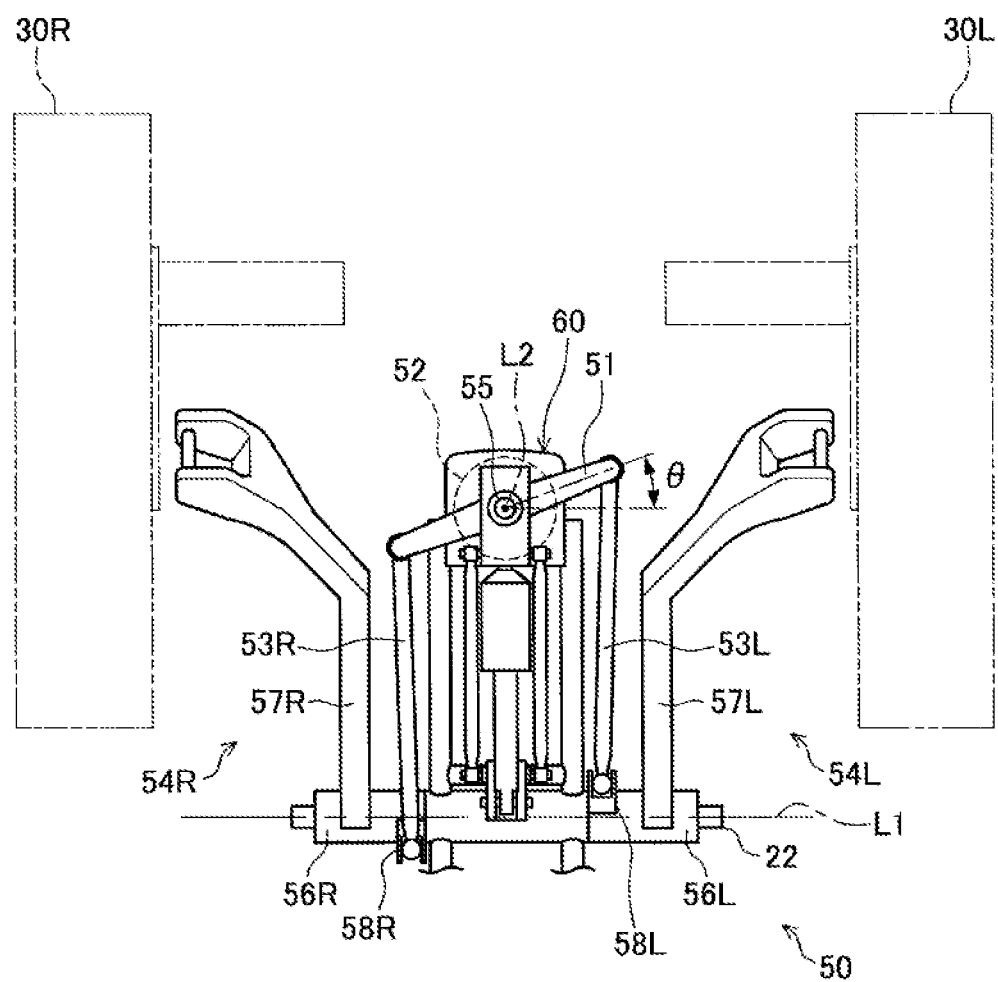
FIG. 9 A view in the direction of the arrow IX of FIG. 8.

Movements of the front suspension 50 and the rear suspension 90 will now be detailed. The configuration of the front suspension 50 and the configuration of the rear suspension 90 are longitudinally symmetrical with each other except for a coupling structure with the crawler traveling devices 30, 70. In the following, therefore, the front suspension 50 will be described, with omission of descriptions of the rear suspension 90. FIG. 8 is a side view explanatory of an actuation state of the front suspension 50. FIG. 9 is a view in the direction of the arrow IX of FIG. 8. FIG. 8 shows a state where the right front crawler traveling device 30R swings downward while the left front crawler traveling device 30L swings upward, from which illustration of the left coupling arm 53L and the left swing arm 54L of the front suspension 50 is omitted.

The front suspension 50 described above is able to interlockingly swing the suspended left and right front crawler traveling devices 30R, 30L in vertically opposite directions. When, in the state shown in FIG. 4, the rotary arm 51 is rotated counterclockwise (leftward) by the motor 52, the right front crawler traveling device 30R swings downward about the rotation shaft 22 (straight line L1) while the left front crawler traveling device 30L swings upward about the rotation shaft 22 (straight line L1), as shown in FIGS. 8 and 9.

In more detail, as shown in FIG. 9, when the rotary arm 51 is rotated counterclockwise (leftward) through an angle θ by the motor 52, the right coupling arm 53R moves rearward. The rearward movement of the right coupling arm 53R causes the second arm 58R of the right swing arm 54R to rotate rearward (clockwise in FIG. 8) about the rotation shaft 22 (straight line L1). Since the right second arm 58R as well as the right support portion 56R rotates integrally with the right first arm 57R, the rearward rotation of the right second arm 58R causes the right first arm 57R to rotate downward (clockwise in FIG. 8) about the rotation shaft 22 (straight line L1), so that the right crawler traveling device 30R swings downward.

On the other hand, when the rotary arm 51 is rotated counterclockwise (leftward) through the angle θ by the motor 52, the left coupling arm 53L moves frontward. The frontward movement of the left coupling arm 53L causes the second arm 58L of the left swing arm 54L to rotate frontward (counterclockwise in FIG. 8) about the rotation shaft 22 (straight line L1). The frontward rotation of the left second arm 58L causes the left first arm 57L to rotate upward (counterclockwise in FIG. 8) about the rotation shaft 22 (straight line L1), so that the left crawler traveling device 30L swings upward. In a case where the rotary arm 51 is rotated clockwise (rightward) by the motor 52, the front suspension 50 moves in a manner reverse to that of the above-described case, and descriptions of such a case are omitted.

Thus, the front suspension 50 causes the suspended left and right front crawler traveling devices 30R, 30L to interlockingly swing in vertically opposite directions. This is because the left and right front crawler traveling devices 30R, 30L are coupled via the rotary arm 51 which is freely rotatably supported on the motor case 60 serving as the swing support unit at the lateral center.

The passenger vehicle 1 is configured to change the attitude angle of the vehicle body frame 10 relative to the horizontal reference plane which is the attitude angle of the driver seat surface 14a relative to the horizontal reference plane, by causing the front suspension 50 to swing the left and right front crawler traveling devices 30R, 30L in vertically opposite directions and causing the rear suspension 90 to swing the left and right rear crawler traveling devices 70R, 70L to swing in vertically opposite directions. Here, the attitude angle of the driver seat surface 14a, which can be changed by the front and rear suspensions 50, 90, is the roll angle of a lateral inclination of the driver seat surface 14a.

For example, in a state where the passenger vehicle 1 is in a horizontal place, the front suspension 50 and the rear suspension 90 cause the right front and right rear crawler traveling devices 30R, 70R to swing downward, and the left front and left rear crawler traveling devices 30L, 70L to swing upward, thereby changing the roll angle which is the attitude angle in such a direction that the right end of the driver seat surface 14a is lowered. On the other hand, the front suspension 50 and the rear suspension 90 cause the right front and right rear crawler traveling devices 30R, 70R to swing upward, and the left front and left rear crawler traveling devices 30L, 70L to swing downward, thereby changing the roll angle which is the attitude angle in such a direction that the left end of the driver seat surface 14a is lowered.

The front and rear crawler traveling devices 30, 70 are interlockingly swung in the vertical direction by the front and rear suspensions 50, 90 without moving in the lateral direction and without rotating about a longitudinal axis. Grounded parts of the front and rear crawler traveling devices 30, 70 are always kept in parallel to the vehicle body frame 10 (driver seat surface 14a), and capable of slide movement in the vertical direction relative to the vehicle body frame 10 (driver seat surface 14a). Accordingly, the attitude angle of the driver seat surface 14a can be changed easily and quickly.

The front suspension 50 is configured to suspend the left and right front crawler traveling devices 30R, 30L as a unit from the vehicle body frame 10, and the rear suspension 90 is configured to suspend the left and right rear crawler traveling devices 70R, 70L as a unit from the vehicle body frame 10. This configuration, which is simpler than a configuration in which the left and right crawler traveling devices 30R, 30L, 70R, 70L are suspended independently of one another, can reduce the number of parts and provide good productivity and maintainability.

Even when, in traveling across a slope ground, the front and rear crawler traveling devices 30, 70 are swung in the vertical direction so as to follow the slope; the grounded parts of the front and rear crawler traveling devices 30, 70 are always kept in parallel to the vehicle body frame 10. It therefore is possible that higher side portions (mountain side portions) of the grounded parts of the front and rear crawler traveling devices 30, 70 serve as an edge to dig into a slope face. For example, in a case where the passenger vehicle 1 travels across a slope face with a higher side (mountain side) to the right thereof and a lower side (valley side) to the left thereof, right side portions of the grounded parts of the front and rear crawler traveling devices 30, 70 can serve as an edge to dig into the slope face. This makes the front and rear crawler traveling devices 30, 70 less likely to sideslip on the slope face, thus providing god traveling performance and rider's comfort during a slope face traveling.

Figure 10:
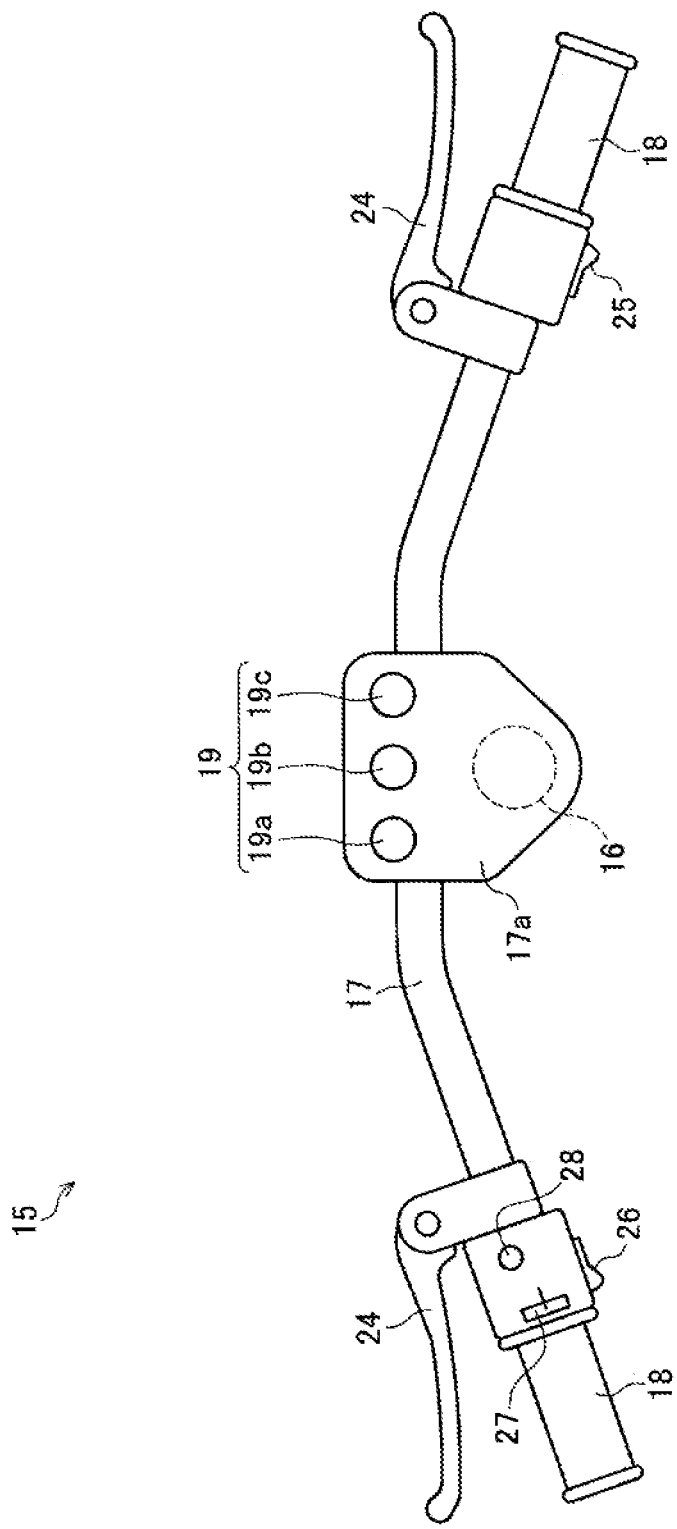
FIG. 10 An outline diagram showing a configuration of a steering handle.

A structure of the steering handle 15 serving as the steering means will now be detailed. FIG. 10 is an outline diagram showing a configuration of the steering handle 15 as viewed from above. As described above, the steering handle 15 includes the steering shaft 16, the steering handlebar 17, and the like. The steering handlebar 17 is attached to the upper end of the steering shaft 16 via a coupling member 17*a*. The steering handlebar 17 has the steering handle grips 18, 18 in left and right end portions thereof. The first indicator 19 is provided on an upper surface of the coupling member 17*a* and at the lateral center of the steering handlebar 17. In front of the left and right steering handle grips 18, 18, brake levers 24, 24 for actuating brake devices of the front and rear crawler traveling devices 30, 70 are respectively disposed. The right steering handle grip 18 is rotatably supported on the steering handlebar 17, and provided with an acceleration sensor (not shown) that detects the rotation angle relative to the steering handlebar 17. Rotational operation on the right steering handle grip 18 can change the traveling speed of the passenger vehicle 1.

Provided on the right side of the steering handlebar 17 is a first attitude changing operation switch 25 serving as attitude changing operation means for changing the attitude angle of the driver seat surface 14*a* relative to the horizontal reference plane. The first attitude changing operation switch 25 is adjacent to the right steering handle grip 18, and provided on the rear side (the driver seat 14 side) of the steering handlebar 17. The first attitude changing operation switch 25 is disposed in such a position as to be operable with a thumb under a state where the steering handle grip 18 is gripped. The first attitude changing operation switch 25 is a push switch of automatic returning type (momentary type), and configured to be operated when its right side portion which locates on the steering handle grip 18 side is pushed with its left side portion serving as a fulcrum. Only while the first attitude changing operation switch 25 is pushed, the attitude angle is changed in such a direction that the right end of the driver seat surface 14*a* is lowered.

Provided on the left side of the steering handlebar 17 are: a second attitude changing operation switch 26 serving as attitude changing operation means for changing the attitude angle of the driver seat surface 14*a* relative to the horizontal reference plane; a mode selecting operation switch 27 serving as mode selecting operation means; and a control reset switch 28 serving as returning operation means. The second attitude changing operation switch 26 is adjacent to the left steering handle grip 18, and provided on the rear side (the driver seat 14 side) of the steering handlebar 17. The second attitude changing operation switch 26 is disposed in such a position as to be operable with a left thumb under a state where the steering handle grip 18 is gripped. The second attitude changing operation switch 26 is a push switch of automatic returning type (momentary type), and configured to be operated when its left side portion which locates on the steering handle grip 18 side is pushed with its right side portion serving as a fulcrum. That is, the second attitude changing operation switch 26 has a configuration that is laterally symmetrical with that of the first attitude changing operation switch 25. Only while the second attitude changing operation switch 26 is pushed, the attitude angle is changed in such a direction that the left end of the driver seat surface 14*a* is lowered.

The mode selecting operation switch 27, by which a mode of controlling the attitude of the passenger vehicle 1 is selected, is for selecting any mode from an automatic control mode, a manual operation mode, and an attitude control cancellation mode. The mode selecting operation switch 27 is adjacent to the left steering handle grip 18, and provided on the upper side of the steering handlebar 17. The mode selecting operation switch 27 is disposed in such a position as to be operable with a thumb under a state where the steering handle grip 18 is gripped. The mode selecting operation switch 27 is a slide switch of position holding type (alternate type), and configured to be slidable in the longitudinal direction (the circumferential direction of the steering handlebar 17) and take three positions of front, middle, and rear positions. The mode selecting operation switch 27 is configured such that: the attitude control cancellation mode is selected when the mode selecting operation switch 27 is in the front position; the manual operation mode is selected when the mode selecting operation switch 27 is in the middle position; and the automatic control mode is selected when the mode selecting operation switch 27 is in the rear position. This mode arrangement enables the mode to be instantaneously switched to the manual operation mode or the attitude control cancellation mode in emergency situations. Alternatively, it may be acceptable that the manual operation mode, the attitude control cancellation mode, and the automatic control mode are arranged in front, middle, and rear, respectively. This mode arrangement enables the mode to be smoothly switched, because the attitude control cancellation mode inevitably intervenes in switching between the automatic control and the manual operation. The mode selecting operation switch 27 is not limited to a slide switch, but may be a button switch or a seesaw switch. In such a case, a state where the switch is not pushed corresponds to the attitude control cancellation mode.

The automatic control mode is a mode in which the control unit controls the motors 52, 92 of the front and rear suspensions 50, 90 based on a detection value of the attitude angle sensor SE1 such that the attitude angle of the driver seat surface 14*a* relative to the horizontal reference plane can converge to a predefined target angle, though details will be given later. The manual operation mode is a mode for changing the attitude angle of the driver seat surface 14*a* relative to the horizontal reference plane through a manual operation, in which the control unit controls the motors 52, 92 based on signals supplied from the first attitude changing operation switch 25 and the second attitude changing operation switch 26. The attitude control cancellation mode is a mode for stopping controlling and changing the attitude angle of the driver seat surface 14*a* relative to the horizontal reference plane, in which the motors 52, 92 are stopped. If the attitude control cancellation mode is selected, the drive shafts of the motors 52, 92 are fixed, and the attitude angle of the driver seat surface 14*a* relative to the horizontal reference plane is kept as it was when the attitude control cancellation mode was selected. At this time, the control unit controls the motors 52, 92 such that the drive shafts of the motors 52, 92 do not turn, but alternatively the drive shafts of the motors 52, 92 may be fixed by an electromagnetic brake or the like.

The control reset switch 28 serving as the returning operation means is for returning various values set in the automatic control mode to predefined initial values (values unchangeable by a driver's normal operation, such as factory preset values). The control reset switch 28 is a push switch of automatic returning type (momentary type), and disposed adjacent to the mode selecting operation switch 27.

Each of the first attitude changing operation switch 25 and the second attitude changing operation switch 26 serving as the attitude changing operation means is operable with a thumb under the state where the steering handle grip 18 is gripped. Accordingly, the driver who is driving is able to operate the first attitude changing operation switch 25 and the second attitude changing operation switch 26 without releasing his/her hand from the steering handle 15, and therefore the attitude angle of the driver seat surface 14a can be changed safely and easily without a deterioration in the driving operability.

The attitude changing operation means includes the first attitude changing operation switch 25 for a right hand and the second attitude changing operation switch 26 for a left hand which are provided separately. When the first attitude changing operation switch 25 for a right hand is pushed, the attitude angle is changed in such a direction that the right end of the driver seat surface 14a is lowered, and when the second attitude changing operation switch 26 for a left hand is pushed, the attitude angle is changed in such a direction that the left end of the driver seat surface 14a is lowered. Since the attitude angle of the driver seat surface 14a is changed in such a direction that the side corresponding to the driver's hand with which the pushing operation is performed is lowered, the change of the attitude angle of the driver seat surface 14a can be adapted to the driver's perception, which provides a good operability.

The mode selecting operation switch 27 serving as the mode selecting operation means is operable with a left thumb under the state where the steering handle grip 18 is gripped. Accordingly, the driver who is driving is able to operate the mode selecting operation switch 27 without releasing his/her hand from the steering handle 15, and therefore the attitude control mode can be selected promptly, safely, and easily without a deterioration in the driving operability. It is possible to reduce the power consumption of the motors 52, 92 in the automatic control mode according to the driver's intent, by frequently changing the mode from the automatic control mode to the manual operation mode so as to reduce the traveling in the automatic control mode. Thus, traveling with a good energy efficiency can be achieved. In a case where the attitude angle need not be controlled or changed because of, for example, a flat road, the attitude control cancellation mode is selected to stop controlling and changing the attitude angle, thereby enabling the power consumption of the motors 52, 92 in the automatic control mode or in the manual operation mode to be reduced, thus achieving traveling with a good energy efficiency. Since changing the attitude control mode does not require decelerating or stopping the passenger vehicle 1, a time for movement can be shortened.

Here, the first attitude changing operation switch 25 and the second attitude changing operation switch 26 serving as the attitude changing operation means for changing the attitude angle is configured to change the attitude angle in priority to the automatic control mode even when the automatic control mode is selected. In the automatic control mode, the attitude angle is controlled while the attitude angle after changed by the first attitude changing operation switch 25 and the second attitude changing operation switch 26 is set as a new target angle. In the steering handle 15 and in the vicinity of the steering handle 15, not only the above-described operation switches but also various operation switches such as a starter switch and a vehicle speed limiting switch (not shown) are provided, the starter switch being for starting up and stopping the passenger vehicle 1, the vehicle speed limiting switch being for setting the upper limit of the vehicle speed of the passenger vehicle 1.

The configurations of the first attitude changing operation switch 25 and the second attitude changing operation switch 26 serving as the attitude changing operation means, and the configuration of the mode selecting operation switch 27 serving as the mode selecting operation means are not limited to the above-described ones. It suffices that they are operable with a thumb under the state where the steering handle grip 18 is gripped. The type, arrangement, and the like, of the switches can be designed as appropriate. For example, the attitude changing operation means composed of the first attitude changing operation switch 25 and the second attitude changing operation switch 26 may be provided on either right or left side of the steering handlebar 17 and disposed adjacent to the steering handle grip 18 in such a position as to be operable with a thumb under the state where the steering handle grip 18 is gripped. In a case where the attitude changing operation means is provided on either right or left side of the steering handlebar 17, it is preferable that the attitude changing operation means is a seesaw push switch of automatic returning type configured such that: its right and left side portions can be pushed with its central portion serving as a fulcrum; when the right side portion is pushed, the attitude angle is changed in such a direction that the right end of the driver seat surface 14a is lowered; and when the left side portion is pushed, the attitude angle is changed in such a direction that the left end of the driver seat surface 14a is lowered. This configuration enables the change of the attitude angle of the driver seat surface 14a to be adapted to the driver's perception, and also enables the number of switches to be reduced.

The first indicator 19 is positioned at the lateral center of the steering handlebar 17, and provided on the upper surface of the coupling member 17a. The driver can see information on the first indicator 19 merely by slightly moving his/her eyes from the front during driving.

The first indicator 19, which includes three lamps 19a, 19b, 19c having different colors, is configured to make a display corresponding to the attitude control mode status, a warning display for warning of an abnormality, and the like, by lighting on, blinking, and lighting off the lamps 19a, 19b, 19c, for example.

Similarly to the first indicator 19, the second indicator 20, which is disposed below the rear portion of the driver seat 14, includes three lamps 20a, 20b, 20c having different colors, and configured to make a display corresponding to the attitude control mode status, a warning display for warning of an abnormality, and the like, by lighting on, blinking, and lighting off the lamps 20a, 20b, 20c. The second indicator 20 is actuated interlockingly with the first indicator 19 (see FIG. 1). The rear and lateral sides of the second indicator 20 are not covered with the main body cover 11 or the like, and visible from the outside of the passenger vehicle 1.

As for the colors of the lamps 19a, 19b, 19c, 20a, 20b, 20c of the first indicator 19 and the second indicator 20, the lamps 19a, 20a are green, the lamps 19b, 20b are orange, and the lamps 19c, 20c are red. The lamps 19a, 20a is for displaying start-up of the passenger vehicle 1, and configured to be lighted on (green) when the passenger vehicle 1 is powered on, and lighted off when the passenger vehicle 1 is powered off. The lamps 19b, 20b is for displaying the attitude control mode status, and configured to be lighted on (orange) when the manual operation mode is selected, blinking (orange) when the automatic control mode is selected, and lighted off when the attitude control cancellation mode is selected. The lamps 19c, 20c are for displaying an abnormality of the passenger vehicle 1, a warning, and the like, and configured to be lighted on (red) when an abnormality occurs in the passenger vehicle 1 or when the attitude angle of the driver seat surface 14a exceeds a predefined angle.

Accordingly, the first indicator 19 allows the driver to instantly recognize the actuation state of the passenger vehicle 1 such as start-up of the passenger vehicle 1, the attitude control mode status, occurrence of an abnormality, and a warning. Thus, an erroneous operation or the like can be prevented, to enables a safer operation. In addition, the second indicator 20 allows someone near the passenger vehicle 1, for example, someone on another passenger vehicle traveling behind the passenger vehicle 1, to instantly recognize the actuation state of the passenger vehicle 1 such as start-up of the passenger vehicle 1, the attitude control mode status, occurrence of an abnormality, and a warning. Thus, safety of surroundings can be ensured. Since the second indicator 20 is disposed below the rear portion of the driver seat 14, the second indicator 20 does not hinder movement of the driver from the riding posture to the position between the left and right rear crawler traveling devices 70, 70 at the rear of the vehicle body frame 10.

The arrangement and configuration of the first indicator 19 and the second indicator 20 are not limited to the above-described ones. The first indicator 19 is disposed near the steering handle 15 serving as the steering means so as to be easily seeable during driving, and for example, may be disposed in a top portion of the main body cover 11 in front of the steering handle 15. The second indicator 20 is disposed in a position visible from the outside of the passenger vehicle, and for example, may be disposed in the left and right rear fenders 13, 13, respectively.

The first indicator 19 and the second indicator 20 may be configured to use a difference in lighting color to display the attitude control mode status, and for example, may be composed of three lamps having different colors instead of the lamps 19b, 20b and configured such that the lamps are lighted on depending on the attitude control mode status. Alternatively, the first indicator 19 and the second indicator 20 may be composed of a single lamp capable of lighting on and blinking with different colors and configured to make a display corresponding to the attitude control mode status, a warning display for warning of an abnormality, and the like, by lighting colors and blinking colors of the lamp. The passenger vehicle 1 may be provided with a buzzer serving as an alarm that actuates with actuation of the first indicator 19 and the second indicator 20. The first indicator 19 may further include a liquid crystal panel that displays various information of the passenger vehicle 1. Information displayed on the liquid crystal panel includes the attitude angle of the driver seat surface 14a, the target angle in the automatic control mode, a warning message, an error message, the remaining battery power, the vehicle speed, the total travel distance (odometer), the segment travel distance (tripmeter), various set values, and the like.

Figure 11:
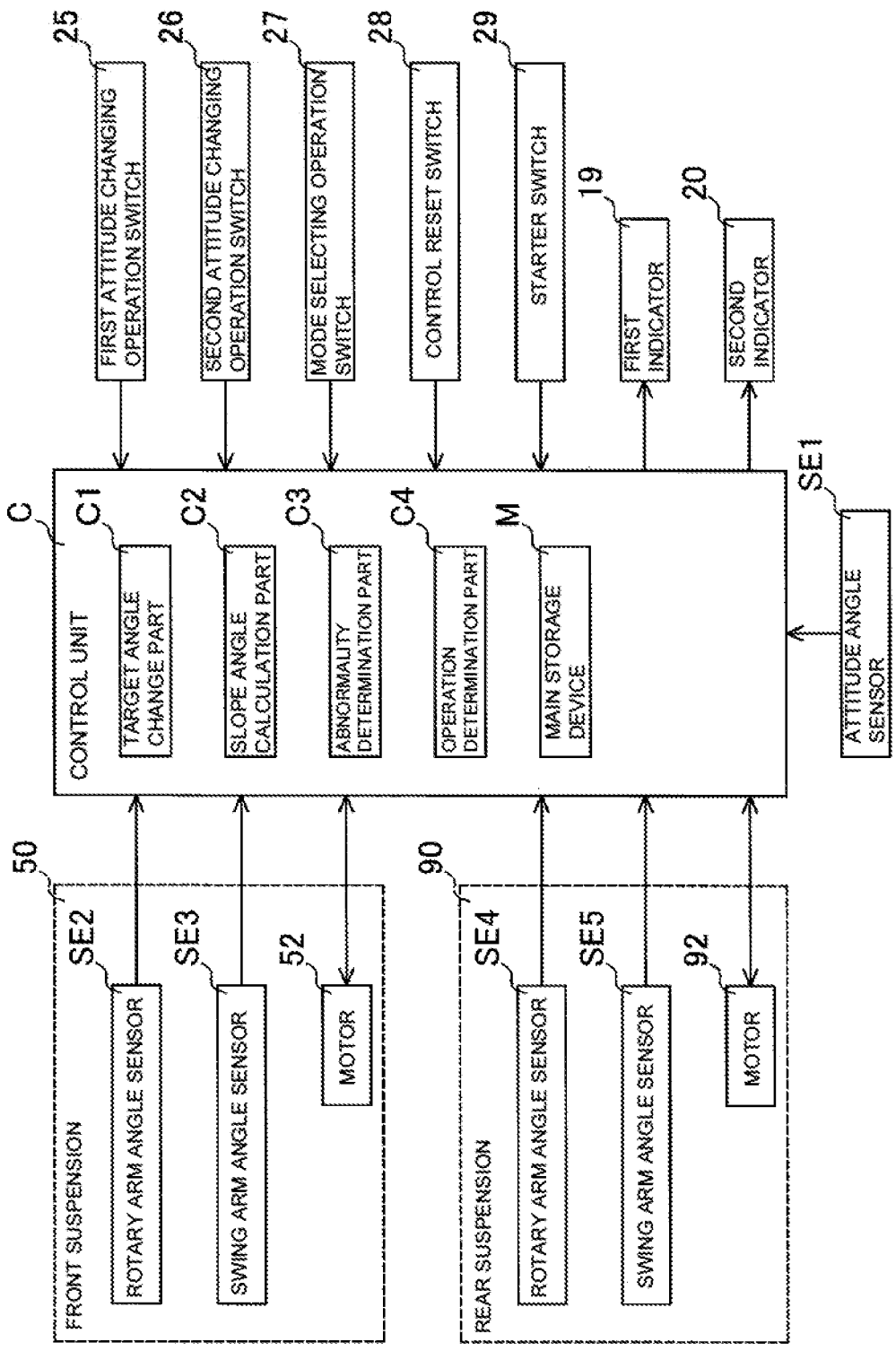
FIG. 11 A block diagram showing principal parts of a control system of the passenger vehicle.

A control system of the passenger vehicle 1 according to this embodiment will now be detailed. FIG. 11 is a block diagram showing principal parts of the control system of the passenger vehicle 1. As described above, the passenger vehicle 1 is provided with a control unit C, and the control unit C controls movements of the passenger vehicle 1 and also enables an automatic control of the passenger vehicle 1.

The control unit C is configured to control movements of the passenger vehicle 1 by reading input signals such as various set values and detection values of various sensors and outputting control signals. A microcomputer including a CPU (Central Processing Unit) for executing arithmetic processing and control processing, a main storage device M for storing data, a timer, an input circuit, an output circuit, a power supply circuit, and the like, is mentioned as an example of the control unit C. The main storage device M as exemplified by a ROM (Read Only Memory) and an EEPROM (Electrically Erasable Programmable Read Only Memory) stores various data and a control program for executing the movements according to this embodiment. Here, the data such as various programs may be stored in an external storage device and read by the control unit C.

The configuration of the control unit C is not particularly limited. The passenger vehicle 1 may include a plurality of control units, for example, control units for controlling the front, rear, left, and right crawler traveling devices 30, 70 serving as the traveling devices, the front and rear suspensions 50, 90 which enable the attitude angle of the driver seat surface 14a to be changed, the first indicator 19 and the second indicator 20, and the like, which are mutually communicable through communication in the passenger vehicle 1 such as CAN (Controller Area Network) communication. FIG. 11 illustrates an exemplary configuration in which movements of the passenger vehicle 1 are controlled by a single control unit C.

Electrically connected to the control unit C are: the attitude angle sensor SE1; the rotary arm angle sensor SE2 that detects the rotation angle of the rotary arm 51 of the front suspension 50 relative to the vehicle body frame 10; the swing arm angle sensor SE3 that detects the rotation angles of the respectively left and right swing arms 54 of the front suspension 50 relative to the vehicle body frame 10; the motor 52 serving as the rotary device of the front suspension 50; the rotary arm angle sensor SE4 that detects the rotation angle of the rotary arm 91 of the rear suspension 90 relative to the vehicle body frame 10; the swing arm angle sensor SE5 that detects the rotation angles of the respective left and right swing arms 94 of the rear suspension 90 relative to the vehicle body frame 10; the motor 92 serving as the rotary device for rotating the rotary arm 91 of the rear suspension 90; the first indicator 19; the second indicator 20, and the like. Electrically connected to the control unit C are switches including the first attitude changing operation switch 25, the second attitude changing operation switch 26, the mode selecting operation switch 27, the control reset switch 28, the starter switch 29, and the like. Electrically connected to the control unit C are various devices other than those illustrated in FIG. 11, such as the motors 36, 76 of the front, rear, left, and right crawler traveling devices 30, 70, various sensors and switches including the acceleration sensor, a steering handle sensor that detects the rotation angle of the steering handle 15, a battery sensor that detects the voltage and current of the battery, the vehicle speed limiting switch, and the like.

For example, when the manual operation mode is selected by the mode selecting operation switch 27, the control unit C outputs control signals to the motors 52, 92 based on operation signals of the first attitude changing operation switch 25 and the second attitude changing operation switch 26, to change the attitude angle of the driver seat surface 14a.

When the automatic control mode is selected by the mode selecting operation switch 27, the control unit C controls movements of the motors 52, 92 of the front and rear suspensions 50, 90 such that the attitude angle of the driver seat surface 14a converges to the predefined target angle stored in the main storage device M, by using the attitude angle of the driver seat surface 14a detected by the attitude angle sensor SE1, the rotation angle of the rotary arm 51 detected by the rotary arm angle sensor SE2, the rotation angles of the left and right swing arms 54 detected by the swing arm angle sensor SE3, the rotation angle of the rotary arm 91 detected by the rotary arm angle sensor SE4, and the rotation angles of the left and right swing arms 94 detected by the swing arm angle sensor SE5.

Here, the target angle is the roll angle of a lateral inclination of the driver seat surface 14a relative to the horizontal reference plane. As for the roll angle serving as the target angle, for the convenience of descriptions, such a direction that the right end of the driver seat surface 14a is lowered as compared with the horizontal reference plane is defined as positive, and the reverse direction as negative.

The target angle is associated with ground slope information at a time of traveling. The ground slope information is information indicating the orientation of a ground slope, and is information indicating the higher side (mountain side) and the lower side (valley side) of a ground relative to the roll direction (lateral direction) of the target angle. That is, the target angle is associated not only with its angle value but also with whether the roll direction is toward the higher side or the lower side.

The orientation (which of the left and right sides is the lower side or the higher side) of the ground slope can be detected from the rotation angle of the left and right swing arms 54, 94. When the rotation angle of the left and right swing arms 54, 94 is defined such that the direction in which the crawler traveling devices 30, 70 swing downward is positive and the direction in which the crawler traveling devices 30, 70 swing upward is negative on the basis of the state where the passenger vehicle 1 is placed on a flat ground parallel to the horizontal reference plane as a reference; for example, if the rotation angle of the right swing arms 54R, 94R is negative, it can be detected that the right side of the driver seat surface 14a is the higher side of the ground.

Whether the roll angle is directed toward the higher side or the lower side can be determined based on a combination of positive/negative of the roll angle and positive/negative of the rotation angle of the right swing arms 54R, 94R as described above. For example, if the product of positive/negative of the roll angle and positive/negative of the rotation angle of the right swing arms 54R, 94R is negative, it can be detected that the roll angle is directed toward the higher side, while if the product is positive, it can be detected that the roll angle is directed to the lower side. Accordingly, positive/negative of the product of positive/negative of the roll angle and positive/negative of the rotation angle of the right swing arms 54R, 94R is, as the ground slope information, associated with a value of the roll angle serving as the target angle, and stored in the main storage device M.

How to detect the orientation of a ground slope is not limited to the above-described one. It can be detected also from the rotation direction of the rotary arms 51, 91, and the detection may be performed based on the rotation angle of the left and right swing arms 54, 94 and the rotation angle of the rotary arms 51, 91, which can provide a more reliable detection result.

The ground slope information is not limited to the above-described configuration, as long as it is information indicating the orientation of the ground slope. For example, it may be the rotation direction of the rotary arms 51, 91. In addition, the ground slope information may include a ground slope angle, and the slope angle can be computed from the rotation angle of the left and right swing arms 54, 94 and the like. It may not be necessary that the target angle is associated with the ground slope information.

When the automatic control mode is selected; upon an operation performed on the first attitude changing operation switch 25 or the second attitude changing operation switch 26, the control unit C outputs control signals to the motors 52, 92 based on an operation signal of the first attitude changing operation switch 25 or the second attitude changing operation switch 26, to change the attitude angle of the driver seat surface 14a. That is, even when the automatic control mode is selected, the first attitude changing operation switch 25 and the second attitude changing operation switch 26 cause the control unit C to change the attitude angle of the driver seat surface 14a.

When the attitude control cancellation mode is selected by the mode selecting operation switch 27, the control unit C outputs a stop control signal to the motors 52, 92, to stop controlling and changing the attitude angle of the driver seat surface 14a.

The control unit C has a target angle change part C1. The target angle change part C1 is configured as a program, for example. When the attitude angle of the driver seat surface 14a is changed by the first attitude changing operation switch 25 or the second attitude changing operation switch 26 while the automatic control mode is selected, the target angle change part C1 changes the target angle in the automatic control mode, which is prestored in the main storage device M, into the attitude angle of the driver seat surface 14a that the attitude angle sensor SE1 has detected at a time of the change. That is, the target angle change part C1 is configured to set, as a new target angle in the automatic control mode, the attitude angle after changed by the first attitude changing operation switch 25 or the second attitude changing operation switch 26 while the automatic control mode is selected.

In addition, the target angle change part C1 causes the main storage device M to store new ground slope information in association with the new target angle after changed. That is, the target angle change part C1 causes the main storage device M to store, as ground slope information, the rotation angle of the left and right swing arms 54 detected by the swing arm angle sensor SE3 and the rotation angle of the left and right swing arms 94 detected by the swing arm angle sensor SE5.

The control unit C also stores, in the main storage device M, the predefined target angle before changed by the target angle change part C1 and the ground slope information associated with the target angle, as an initial target angle and initial slope information (initial value), and based on an operation signal of the control reset switch 28, changes the target angle and the slope information after changed by the target angle change part C1 into the initial target angle and the initial slope information (initial value).

The control unit C further has a slope angle calculation part C2, an abnormality determination part C3, and an operation determination part C4. The slope angle calculation part C2, the abnormality determination part C3, and the operation determination part C4 are also configured as a program, for example.

The slope angle calculation part C2 computes the orientation (which of the left and right sides is the lower side or the higher side) and angle of a ground slope where the passenger vehicle 1 is traveling or stopped, which constitute the ground slope information, based on the rotation angle of the left and right swing arms 54 detected by the swing arm angle sensor SE3 and the rotation angle of the left and right swing arms 94 detected by the swing arm angle sensor SE5.

The abnormality determination part C3 determines whether or not the ground slope angle calculated by the slope angle calculation part C2 is equal to or more than a predefined caution requiring angle which is stored in the main storage device M. Here, the caution requiring angle is a ground slope angle at which the passenger vehicle 1 is considered to stably travel without an excessive inclination. For example, the caution requiring angle is 45 degrees. If the abnormality determination part C3 determines that the slope angle computed by the slope angle calculation part C2 is equal to or more than the caution requiring angle, the control unit C outputs a control signal to the first indicator 19 and the second indicator 20 so as to cause the first indicator 19 and the second indicator 20 to make a warning display described above.

The operation determination part C4 determines whether or not the rotation angle of the left and right swing arms 54 detected by the swing arm angle sensor SE3 and the rotation angle of the left and right swing arms 94 detected by the swing arm angle sensor SE5 are less than a predefined operation limit angle which is stored in the main storage device M. The operation limit angle is an operation limit of the front and rear suspensions 50, 90, that is, a limit angle of the rotation angle of the left and right swing arms 54, 94 rotated by the motors 52, 92. The operation limit angle is, for example, the rotation angle of the left and right swing arms 54 and the rotation angle of the left and right swing arms 94 at a time when the attitude angle of the driver seat surface 14a is 30 degrees on a flat ground parallel to the horizontal reference plane.

If, in the manual operation mode, the operation determination part C4 determines that the rotation angle of the right swing arms 54R, 94R detected by the swing arm angle sensors SE3, SE5 is equal to or more than the predefined operation limit angle which is stored in the main storage device M, the control unit C does not output a control signal to the motors 52, 92 based on an operation signal of the first attitude changing operation switch 25. If the operation determination part C4 determines that the rotation angle of the left swing arms 54L, 94L detected by the swing arm angle sensors SE3, SE5 is equal to or more than the operation limit angle, the control unit C does not output a control signal to the motors 52, 92 based on an operation signal of the second attitude changing operation switch 26. That is, the control unit C is configured to stop the function of the first attitude changing operation switch 25 or the second attitude changing operation switch 26 based on a determination result of the operation determination part C4. A range in which the attitude angle of the driver seat surface 14a is changeable by the operation of the first attitude changing operation switch 25 or the second attitude changing operation switch 26 is restricted, so that a deterioration in the traveling stability due to an excessive change of the attitude angle can be prevented. Moreover, a failure of the motors 52, 92 and a damage to the drive shafts of the motors 52, 92, the gears, the rotation shafts 55, 95 of the rotary arms 51, 91, and the like, can be prevented.

In the automatic control mode as well as the manual operation mode, the control unit C stops the function of the first attitude changing operation switch 25 or the second attitude changing operation switch 26 based on a determination result of the operation determination part C4.

The control unit C is configured to output a control signal to the first indicator 19 and the second indicator 20 such that the first indicator 19 and the second indicator 20 make a display corresponding to the attitude control mode status described above, based on operation signals of the starter switch 29 and the mode selecting operation switch 27. Upon occurrence of an abnormality in the passenger vehicle 1, the control unit C outputs a control signal to the first indicator 19 and the second indicator 20 such that the first indicator 19 and the second indicator 20 make an abnormality display described above if, for example, detection values of various sensors are abnormal values or the current and voltage of the battery, the motors 52, 92, or the like, have abnormal values.

Figure 12:
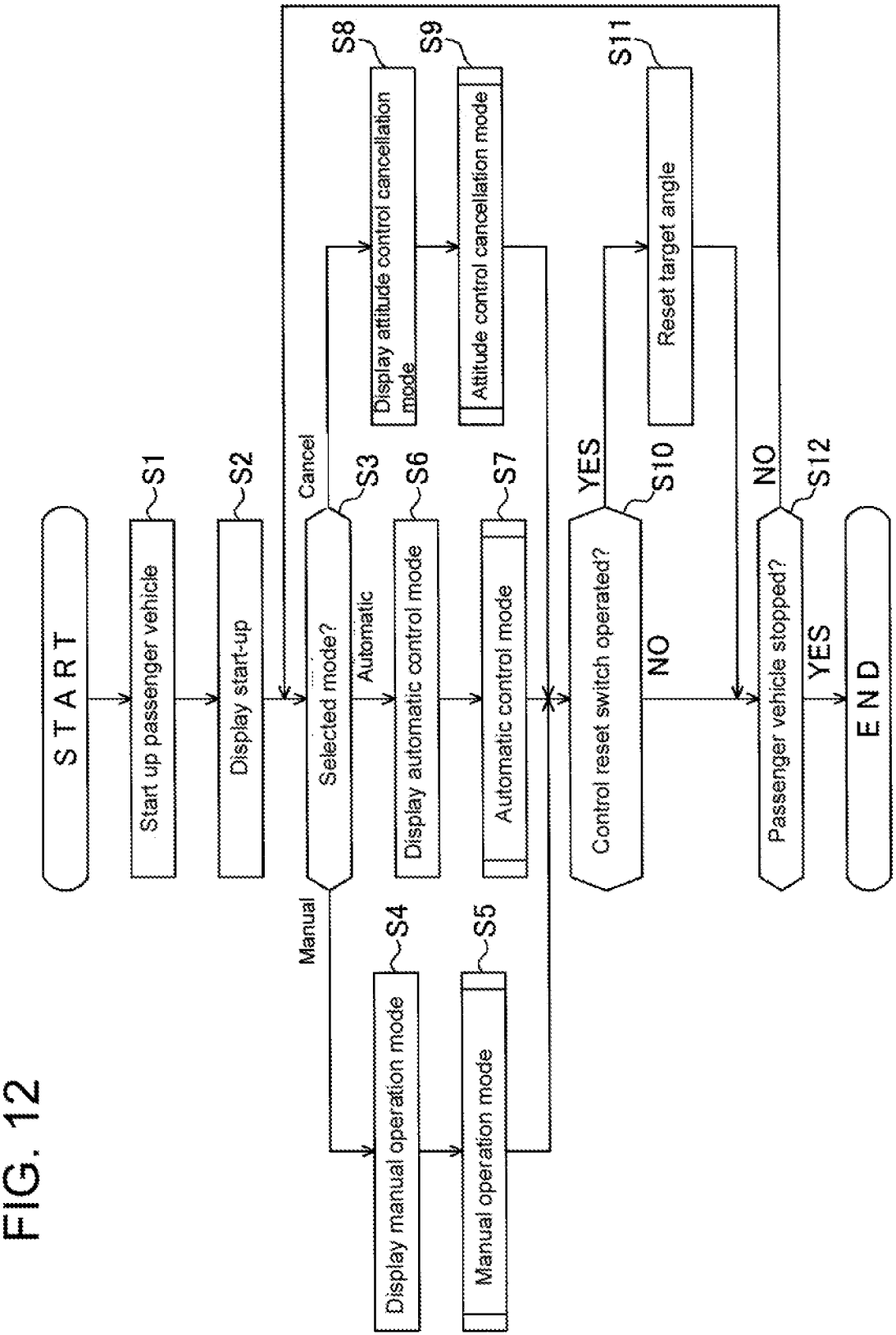
FIG. 12 A flow diagram showing an example of a main flow of controlling the attitude angle.
Figure 13:
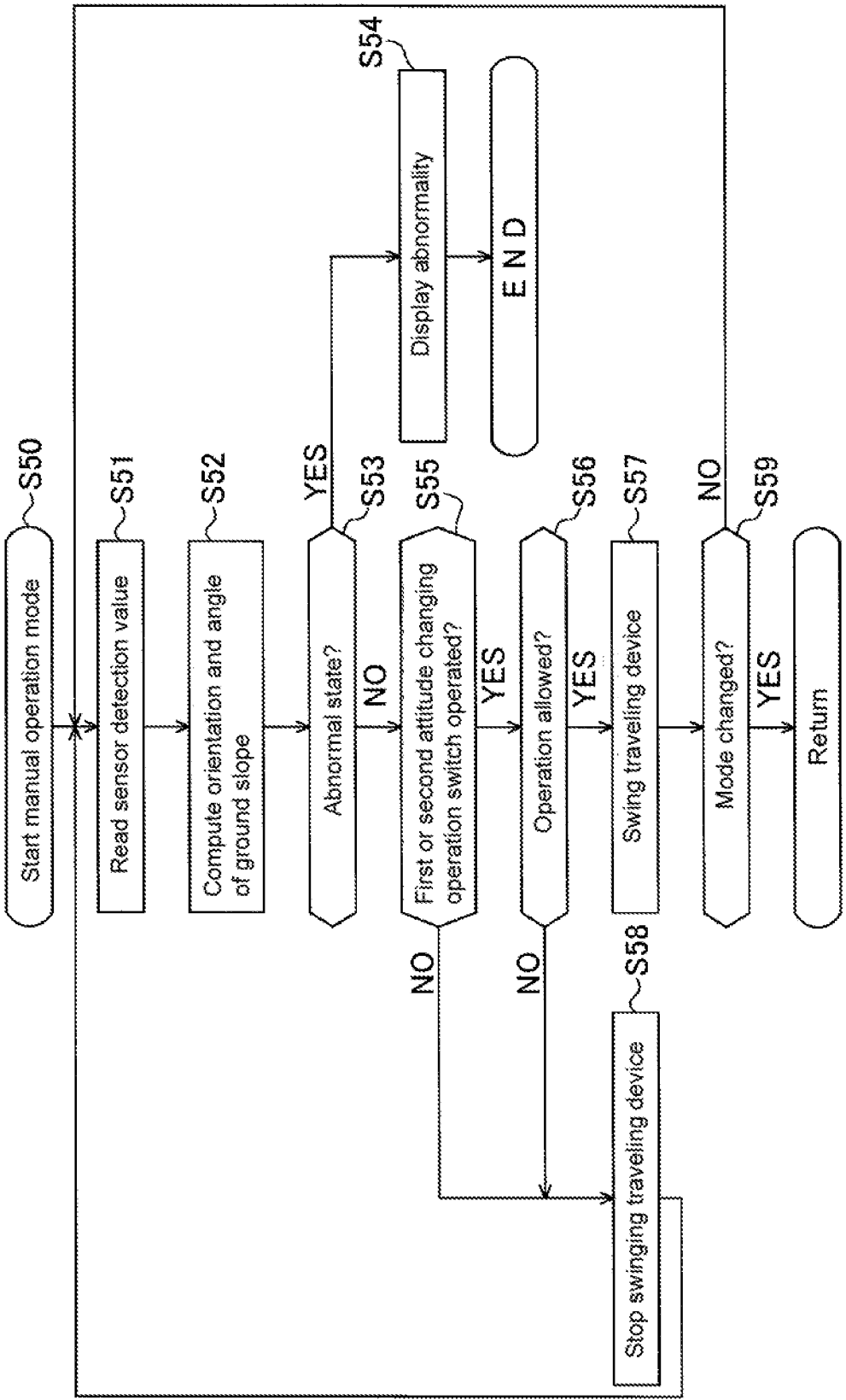
FIG. 13 A flow diagram showing an exemplary flow of a manual operation mode.
Figure 14:
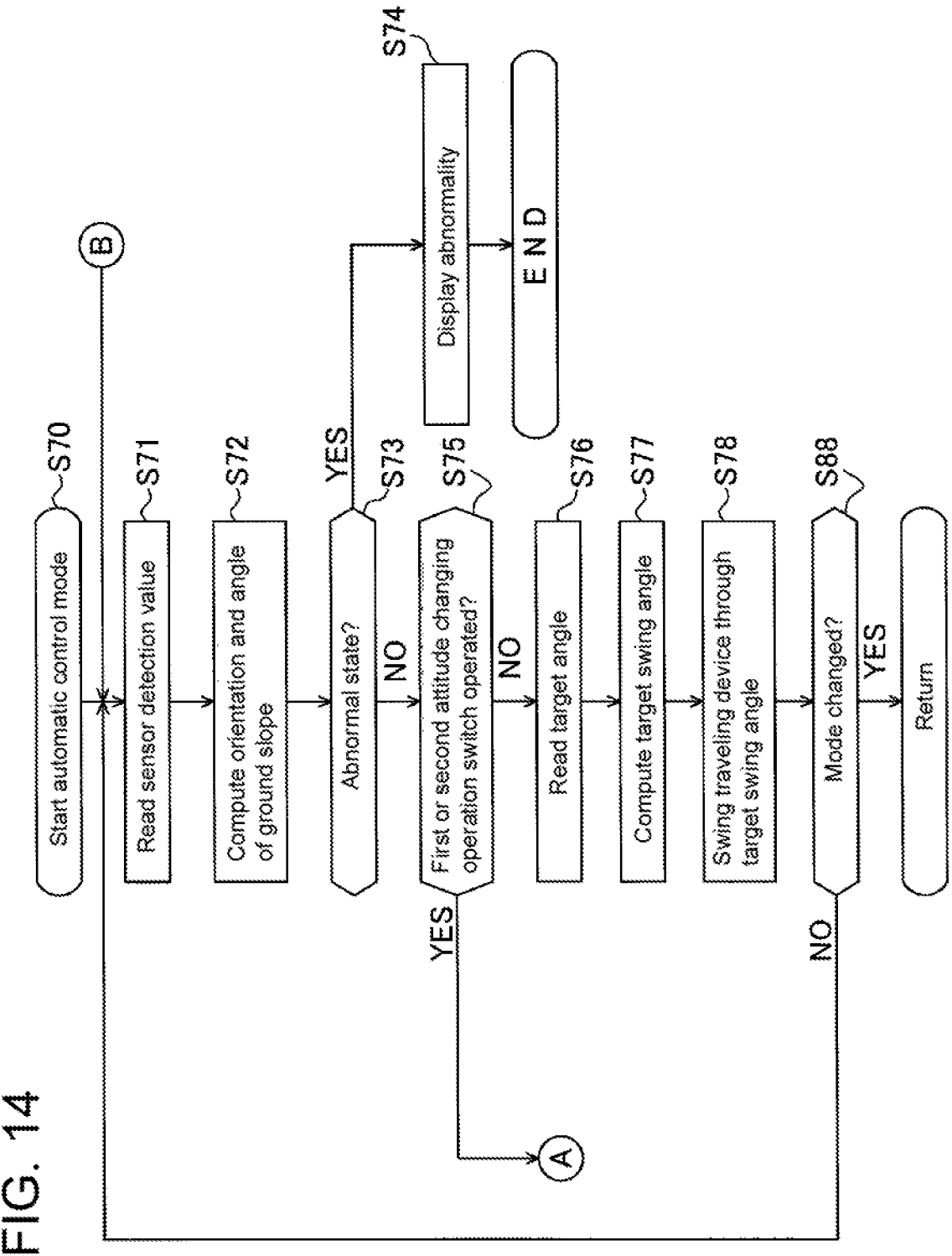
FIG. 14 A flow diagram showing an exemplary flow of an automatic control mode.
Figure 15:
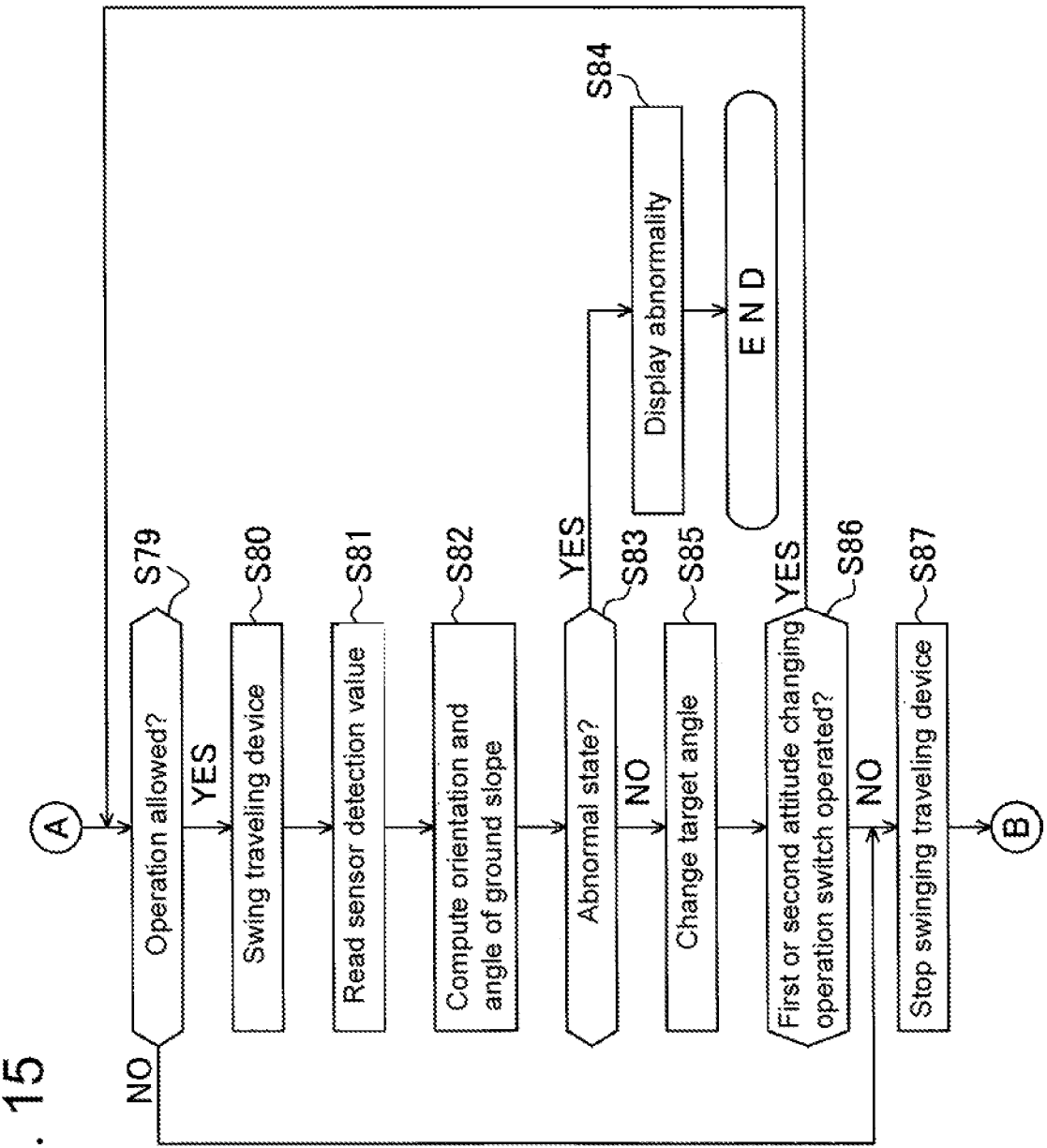
FIG. 15 A flow diagram showing an exemplary flow of changing a target angle in the automatic control mode.
Figure 16:
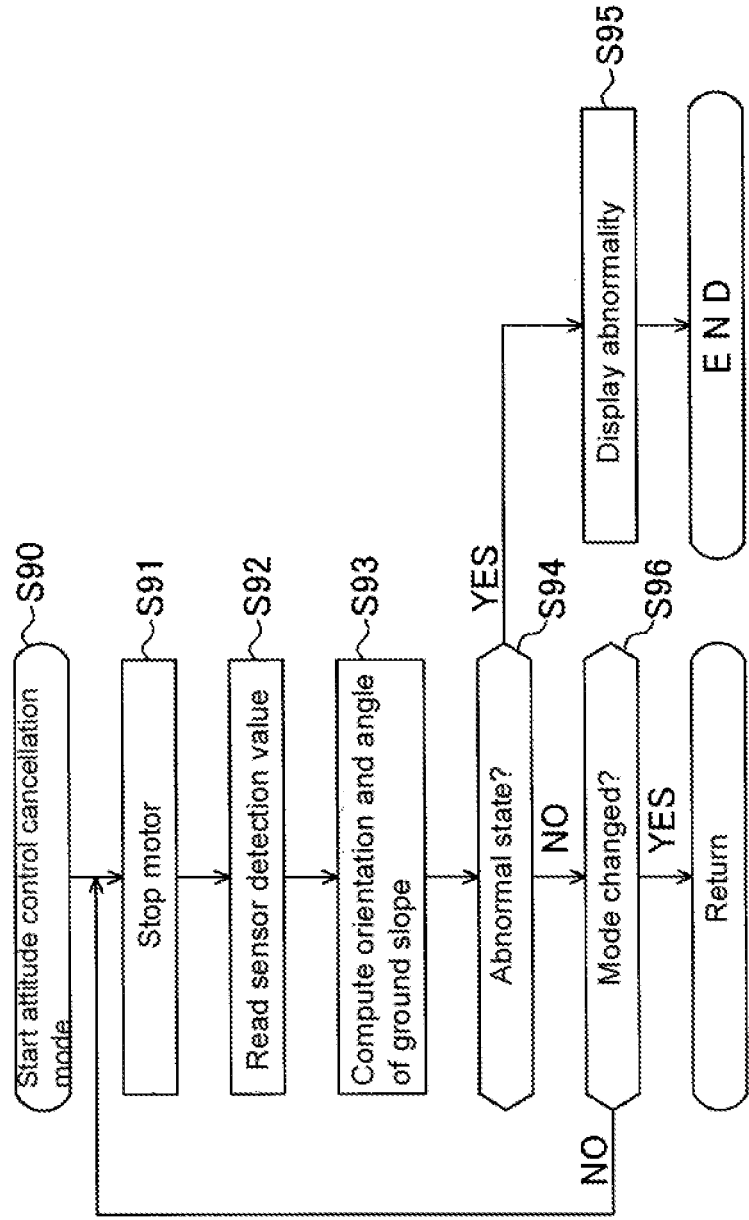
FIG. 16 A flow diagram showing an exemplary flow of an attitude control cancellation mode.

The passenger vehicle 1 having the above-described configuration is able to control and change the attitude angle of the driver seat surface 14a. Next, how to control the attitude angle of the driver seat surface 14a of the passenger vehicle 1 according to this embodiment will be detailed. FIG. 12 is a flow diagram showing an example of a main flow of controlling the attitude angle; FIG. 13 is a flow diagram showing an exemplary flow of the manual operation mode; FIG. 14 is a flow diagram showing an exemplary flow of the automatic control mode; FIG. 15 is a flow diagram showing an exemplary flow of changing the target angle in the automatic control mode; and FIG. 16 is a flow diagram showing an exemplary flow of the attitude control cancellation mode. Although the control unit C performs a control of the vehicle speed, steering, and the like, concurrently with a control of the attitude angle of the driver seat surface 14a, descriptions thereof are omitted.

Firstly, the passenger vehicle 1 is powered on by the starter switch 29 being operated, so that the passenger vehicle 1 starts up (step S1). Upon start-up of the passenger vehicle 1, the first indicator 19 and the second indicator 20 make a display corresponding to the start-up state (step S2). More specifically, the control unit C outputs a control signal to the first indicator 19 and the second indicator 20, to light on (green) the lamps 19a, 20a of the first indicator 19 and the second indicator 20.

Then, selection of the attitude control mode is made by the driver operating the mode selecting operation switch 27 (step S3). If the manual operation mode is selected, (step S3; Manual), the first indicator 19 and the second indicator 20 make a display corresponding to the manual operation mode state (step S4). More specifically, the control unit C outputs a control signal to the first indicator 19 and the second indicator 20, to light on (orange) the lamps 19b, 20b of the first indicator 19 and the second indicator 20. Then, the manual operation mode is executed, to bring the passenger vehicle 1 into a state where the attitude angle of the driver seat surface 14a relative to the horizontal reference plane is changeable by a manual operation (step S5).

If the automatic control mode is selected (step S3; Automatic), the first indicator 19 and the second indicator 20 make a display corresponding to the automatic control mode state (step S6). More specifically, the control unit C outputs a control signal to the first indicator 19 and the second indicator 20, to blink (orange) the lamps 19b, 20b of the first indicator 19 and the second indicator 20. Then, the automatic control operate mode is executed, to bring the passenger vehicle 1 into a state where the attitude angle of the driver seat surface 14a relative to the horizontal reference plane is controlled to converge to the predefined target angle (step S7).

If the attitude control cancellation mode is selected (step S3; Cancel), the first indicator 19 and the second indicator 20 make a display corresponding to the attitude control cancellation mode state (step S8). More specifically, the control unit C outputs a control signal to the first indicator 19 and the second indicator 20, to light off the lamps 19b, 20b of the first indicator 19 and the second indicator 20. That is, the first indicator 19 and the second indicator 20 continues the same display as the display corresponding to the start-up state. Then, the attitude control cancellation mode is executed, to bring the passenger vehicle 1 into a state where the attitude angle of the driver seat surface 14a relative to the horizontal reference plane is kept as it was when the attitude control cancellation mode was selected.

By the driver operating the starter switch 29, the passenger vehicle 1 is powered off and stops (step S12). The lamps 19a, 20a of the first indicator 19 and the second indicator 20 are lighted off.

Next, the manual operation mode in step S5 will be described. As shown in FIG. 13, the manual operation mode is started by the driver operating the mode selecting operation switch 27 so as to select the manual operation mode (step S50). Then, the control unit C reads detection values of various sensors (step S51). More specifically, the control unit C reads the attitude angle of the driver seat surface 14a detected by the attitude angle sensor SE1, the rotation angle of the rotary arm 51 detected by the rotary arm angle sensor SE2, the rotation angle of the left and right swing arms 54 detected by the swing arm angle sensor SE3, the rotation angle of the rotary arm 91 detected by the rotary arm angle sensor SE4, the rotation angle of the left and right swing arms 94 detected by the swing arm angle sensor SE5, and the like.

Then, the slope angle calculation part C2 computes the orientation and angle of a ground slope where the passenger vehicle 1 is traveling or stopped, which constitute ground slope information (step S52). As described above, the orientation and angle of the slope, which constitute the slope information, are obtained from the rotation angle of the left and right swing arms 54 detected by the swing arm angle sensor SE3 and the rotation angle of the left and right swing arms 94 detected by the swing arm angle sensor SE5.

The abnormality determination part C3 determines whether or not the ground slope angle of the ground where the passenger vehicle 1 is traveling or stopped is equal to or more than the predefined caution requiring angle which is stored in the main storage device M (step S53). If it is determined that the ground slope angle is equal to or more than the caution requiring angle and there is an abnormality (step S53; YES), the first indicator 19 and the second indicator 20 make a display corresponding to the abnormality state (step S54), and the passenger vehicle 1 discontinues traveling, to stop. More specifically, the control unit C outputs a control signal to the first indicator 19 and the second indicator 20, to light on (red) the lamps 19c, 20c of the first indicator 19 and the second indicator 20, and moreover outputs a control signal to the motors 36, 76 of the front, rear, left, and right crawler traveling devices 30, 70, so that the passenger vehicle 1 discontinues traveling.

It may be acceptable that, if it is determined that there is an abnormality, the control unit C causes the first indicator 19 and the second indicator 20 to make a display corresponding to the abnormality state without discontinuing traveling of the passenger vehicle 1. The abnormality determination part C3 may further determine whether or not various devices are normally actuating, and if it is determined that the various devices are not normally actuating, may cause the first indicator 19 and the second indicator 20 to make a display corresponding to the abnormality state.

If it is determined that the ground slope angle is less than the caution requiring angle and the state is normal (step S53; NO), the control unit C determines whether or not either the first attitude changing operation switch 25 or the second attitude changing operation switch 26 serving as the attitude changing operation means is operated (step S55).

If it is determined that either the first attitude changing operation switch 25 or the second attitude changing operation switch 26 is operated (step S55; YES), the operation determination part C4 determines whether or not the rotation angle of the left and right swing arms 54 detected by the swing arm angle sensor SE3 and the rotation angle of the left and right swing arms 94 detected by the swing arm angle sensor SE5 are less than the predefined operation limit angle which is stored in the main storage device M (step S56).

If it is determined that the rotation angle of the left and right swing arms 54, 94 is less than the operation limit angle so that the operation is allowed (step S56; YES), the front and rear suspensions 50, 90 cause the front and rear crawler traveling devices 30, 50 to swing at a predetermined speed in the direction corresponding to the operation on the first attitude changing operation switch 25 or the second attitude changing operation switch 26 (step S57). In more detail, the control unit C outputs a control signal to the motors 52, 92, to cause the rotary arms 51, 91 to rotate at a predetermined speed in the direction corresponding to the operation on the first attitude changing operation switch 25 and the second attitude changing operation switch 26. Accordingly, the attitude angle of the driver seat surface 14a is changed at a predetermined speed in the direction corresponding to the operation on the first attitude changing operation switch 25 and the second attitude changing operation switch 26.

If it is determined that the rotation angle of the left and right swing arms 54, 94 is equal to or more than the operation limit angle so that the operation is not allowed (step S56; NO), swinging of the front and rear crawler traveling devices 30, 70 by the front and rear suspensions 50, 90 is stopped (step S58). In more detail, the control unit C outputs a control signal to the motors 52, 92, to stop the rotation of the rotary arms 51, 91 and fix the rotary arms 51, 91 against rotation about the rotation shafts 55, 95.

Even in a case where it is determined that the rotation angle of the right swing arms 54R, 94R detected by the swing arm angle sensors SE3, SE5 is equal to or more than the operation limit angle; if the second attitude changing operation switch 26 is operated, the control unit C determines that the operation is allowed, and outputs a control signal to the motors 52, 92 based on an operation signal of the second attitude changing operation switch 26. Likewise, even in a case where it is determined that the rotation angle of the left swing arms 54L, 94R detected by the swing arm angle sensors SE3, SE5 is equal to or more than the operation limit angle; if the first attitude changing operation switch 25 is operated, the control unit C determines that the operation is allowed, and outputs a control signal to the motors 52, 92 based on an operation signal of the first attitude changing operation switch 25.

Accordingly, if such an operation that the rotation angle of the swing arms 54, 94 is equal to or more than the operation limit angle is performed, the attitude angle of the driver seat surface 14a is maintained at the angle obtained when the rotation of the rotary arms 51, 91 is stopped, and not changed. If such an operation that the rotation angle of the swing arms 54, 94 is less than the operation limit angle is performed, the attitude angle of the driver seat surface 14a is changed. The fixing of the rotary arms 51, 91 may be implemented not by the motors 52, 92 but by, for example, an electromagnetic brake.

If it is determined in step S55 that either the first attitude changing operation switch 25 or the second attitude changing operation switch 26 is not operated (step S55; NO), similarly to when it is determined that the operation is not allowed in step S56 (step S56; NO), swinging of the front and rear crawler traveling devices 30, 70 by the front and rear suspensions 50, 90 is stopped (step S58). The attitude angle of the driver seat surface 14a is maintained at the angle obtained when the rotation of the rotary arms 51, 91 is stopped. The case where it is determined that either the first attitude changing operation switch 25 or the second attitude changing operation switch 26 is not operated includes a state where both the first attitude changing operation switch 25 and the second attitude changing operation switch 26 are operated.

In this manner, in the manual operation mode, the driver is able to change the attitude angle of the driver seat surface 14a by manually operating the first attitude changing operation switch 25 and the second attitude changing operation switch 26 serving as the attitude changing operation means. Swinging of the front and rear crawler traveling devices 30, 70 does not become equal to or more than the operation limit angle.

The manual operation mode is terminated by the driver operating the mode selecting operation switch 27 so as to change the mode to a mode other than the manual operation mode, that is, so as to select the automatic control mode or the attitude control cancellation mode (step S59).

Next, the automatic control mode in step S7 will be described. As shown in FIG. 14, the automatic control mode is started by the driver operating the mode selecting operation switch 27 so as to select the automatic control mode (step S70). Then, the control unit C reads detection values of various sensors (step S71). The detection values to be read are the attitude angle of the driver seat surface 14a detected by the attitude angle sensor SE1, the rotation angle of the rotary arm 51 detected by the rotary arm angle sensor SE2, the rotation angle of the left and right swing arms 54 detected by the swing arm angle sensor SE3, the rotation angle of the rotary arm 91 detected by the rotary arm angle sensor SE4, the rotation angle of the left and right swing arms 94 detected by the swing arm angle sensor SE5, and the like. Then, the slope angle calculation part C2 computes the orientation and angle of a ground slope where the passenger vehicle 1 is traveling or stopped, which constitute ground slope information (step S72). The abnormality determination part C3 determines whether or not the ground slope angle of the ground where the passenger vehicle 1 is traveling or stopped is equal to or more than the predefined caution requiring angle which is stored in the main storage device M (step S73). If it is determined that the ground slope angle is equal to or more than the caution requiring angle and there is an abnormality (step S73; YES), the first indicator 19 and the second indicator 20 make a display corresponding to the abnormality state (step S74), and the passenger vehicle 1 discontinues traveling, to stop. If it is determined that the ground slope angle is less than the caution requiring angle and the state is normal (step S73; NO), the control unit C determines whether or not either the first attitude changing operation switch 25 or the second attitude changing operation switch 26 serving as the attitude changing operation means is operated (step S75). Here, step S71 to step S75 are the same as step S51 to step S55 of the manual operation mode described above, and therefore descriptions thereof are omitted.

If it is determined that either the first attitude changing operation switch 25 or the second attitude changing operation switch 26 is not operated (step S75; NO), the control unit C reads a target angle stored in the main storage device M, and the ground slope information associated with the target angle (step S76).

Then, the control unit C computes a target swing angle which is such an angle that, when the front and rear suspensions 50, 90 swing the left and right crawler traveling devices 30, 70 through the angle, the attitude angle of the driver seat surface 14a reaches the target angle (step S77). In more detail, the control unit C computes a target rotation angle of the rotary arms 51, 91 of the front and rear suspensions 50, 90 so as to make the attitude angle of the driver seat surface 14a reach the target angle. Here, the control unit C computes the target rotation angle of the rotary arms 51, 91 by using the attitude angle of the driver seat surface 14a detected by the attitude angle sensor SE1, the rotation angle of the rotary arm 51 detected by the rotary arm angle sensor SE2, the rotation angle of the left and right swing arms 54 detected by the swing arm angle sensor SE3, the rotation angle of the rotary arm 91 detected by the rotary arm angle sensor SE4, and the rotation angle of the left and right swing arms 94 detected by the swing arm angle sensor SE5, which have been read in step S71.

The control unit C causes the front and rear suspensions 50, 90 to swing the front and rear crawler traveling devices 30, 50 through the target swing angle such that the attitude angle of the driver seat surface 14a reaches the target angle (step S78). In more detail, the control unit C outputs a control signal to the motors 52, 92, to rotate the rotary arms 51, 91 through the target rotation angle computed in step S77.

If it is determined in step S75 that either the first attitude changing operation switch 25 or the second attitude changing operation switch 26 is operated (step S75; YES), as shown in FIG. 15, the operation determination part C4 determines whether or not the rotation angle of the left and right swing arms 54, 94 detected by the swing arm angle sensors SE3, SE5 is less than the predefined operation limit angle which is stored in the main storage device M (step S79), similarly to step S56 of the manual operation mode.

If it is determined that the rotation angle of the left and right swing arms 54, 94 is less than the operation limit angle, or that the operation on the first attitude changing operation switch 25 and the second attitude changing operation switch 26 is such an operation that the rotation angle of the swing arms 54, 94 is less than the operation limit angle so that the operation is allowed (step S79; YES), the front and rear suspensions 50, 90 swing the front and rear crawler traveling devices 30, 50 at a predetermined speed in the direction corresponding to the operation on the first attitude changing operation switch 25 and the second attitude changing operation switch 26 (step S80). In more detail, the control unit C outputs a control signal to the motors 52, 92, to rotate the rotary arms 51, 91 at a predetermined speed in the direction corresponding to the operation on the first attitude changing operation switch 25 and the second attitude changing operation switch 26. Accordingly, even when the automatic control mode is selected, the attitude angle of the driver seat surface 14a is changed at a predetermined speed in the direction corresponding to the operation on the first attitude changing operation switch 25 and the second attitude changing operation switch 26.

Then, similarly to step S71 to step S73, the control unit C reads detection values of various sensors (step S81); the slope angle calculation part C2 computes the orientation and angle of a ground slope where the passenger vehicle 1 is traveling or stopped, which constitute ground slope information (step S82); and the abnormality determination part C3 determines whether or not the ground slope angle of the ground where the passenger vehicle 1 is traveling or stopped is equal to or more than the predefined caution requiring angle which is stored in the main storage device M (step S83). If it is determined that the ground slope angle is equal to or more than the caution requiring angle and there is an abnormality (step S83; YES), the first indicator 19 and the second indicator 20 make a display corresponding to the abnormality state (step S84), and the passenger vehicle 1 discontinues traveling, to stop.

If it is determined that the ground slope angle is less than the caution requiring angle and the state is normal (step S83; NO), the target angle change part C1 changes the target angle in the automatic control mode, which is prestored in the main storage device M, into the attitude angle of the driver seat surface 14a detected by the attitude angle sensor SE1, which has been read in step S81 (step S85). The target angle change part C1 associates the rotation angle of the left and right swing arms 54, 94 detected by the swing arm angle sensors SE3, SE5 and read in step S81 with the new target angle obtained after the change, and stores it as new ground slope information in the main storage device M.

Then, similarly to step S75, the control unit C determines whether or not either the first attitude changing operation switch 25 or the second attitude changing operation switch 26 is operated (step S86). If it is determined in step S86 that either the first attitude changing operation switch 25 or the second attitude changing operation switch 26 is operated (step S86; YES), the processing returns to step S79.

If it is determined in step S86 that either the first attitude changing operation switch 25 or the second attitude changing operation switch 26 is not operated (step S86; NO), similarly to step S58 described above, swinging of the front and rear crawler traveling devices 30, 70 by the front and rear suspensions 50, 90 is stopped (step S87), and the processing returns to step S71.

If it is determined in step S79 that the rotation angle of the left and right swing arms 54, 94 is equal to or more than the operation limit angle so that the operation is not allowed (step S79; NO), similarly to step S58, swinging of the front and rear crawler traveling devices 30, 70 by the front and rear suspensions 50, 90 is stopped (step S87), and the processing returns to step S71.

The automatic control mode is terminated by the driver operating the mode selecting operation switch 27 so as to change the mode to a mode other than the automatic control mode, that is, so as to select the manual operation mode or the attitude control cancellation mode (step S88).

Here, by an operation performed on the control reset switch 28, the target angle changed by the target angle change part C1 in step S85 and the ground slope information associated with that target angle are, as shown in FIG. 12, changed into a predefined initial target angle and initial ground slope information associated with that initial target angle (step S10, step S11).

In this manner, in the automatic control mode, the attitude control can be performed that converges the attitude angle of the driver seat surface 14a to the predefined target angle. Even in the automatic control mode, the attitude angle of the driver seat surface 14a relative to the horizontal reference plane can be changed by the first attitude changing operation switch 25 and the second attitude changing operation switch 26 serving as the attitude changing operation means, and thus a good usability is obtained.

Figure 17A:
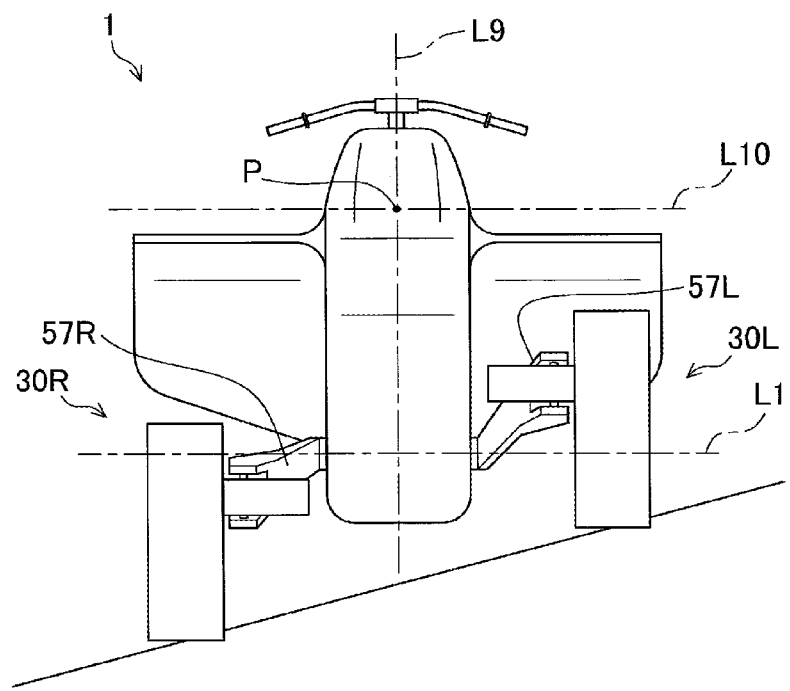
FIG. 17A shows a state where the attitude of a driver seat surface is substantially horizontal.
Figure 17B:
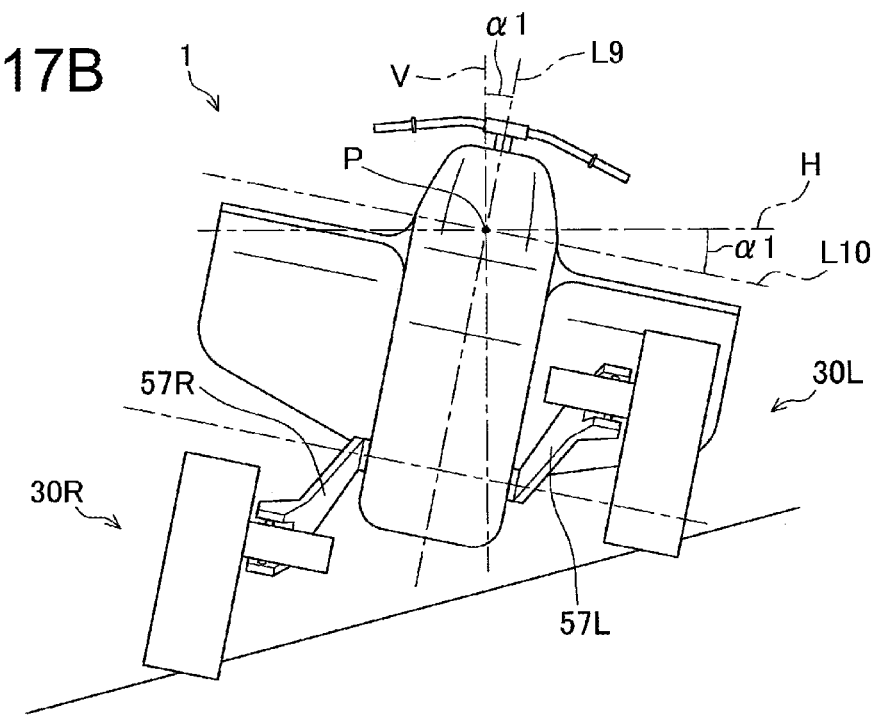
FIG. 17B shows a state where the attitude of the driver seat surface is inclined to the higher side.

For example, as shown in FIG. 17A, when the predefined target angle is zero degrees and the automatic control mode is the attitude control mode for converging the attitude angle of the driver seat surface 14a to a horizontal angle; by operating the second attitude changing operation switch 26 so as to incline the attitude angle of the driver seat surface 14a relative to the horizontal reference plane to the higher side (mountain side), the traveling can be promptly changed to traveling that is less likely to cause overturn to the lower side (valley side) as shown in FIG. 17B. FIG. 17 is an outline diagram showing an exemplary state when the passenger vehicle 1 is traveling across a slope ground, in which FIG. 17A shows a state where the attitude angle of the driver seat surface 14a is substantially horizontal, and FIG. 17B shows a state where the attitude angle of the driver seat surface 14a is inclined to the higher side. FIG. 17A and FIG. 17B are outline diagrams of the passenger vehicle 1 as viewed from the front, with the right side of the drawing being the higher side and the left side of the drawing being the lower side. In FIG. 17A and FIG. 17B, the point P represents the lateral center on the driver seat surface 14a; the angle α1 is the attitude angle of the driver seat surface 14a relative to the horizontal reference plane; the straight line L9 is a straight line perpendicular to the driver seat surface 14a and passing through the point P; the straight line L10 is a straight line parallel to the driver seat surface 14a and passing through the point P; the straight line H is a horizontal straight line passing through the point P; and the straight line V is a vertical straight line passing through the point P. When traveling on a slope face with a relatively steep slope angle, the driver seat surface 14a is inclined to the higher side as shown in FIG. 17B, so that the traveling can be made with an improved safety.

Figure 18A:
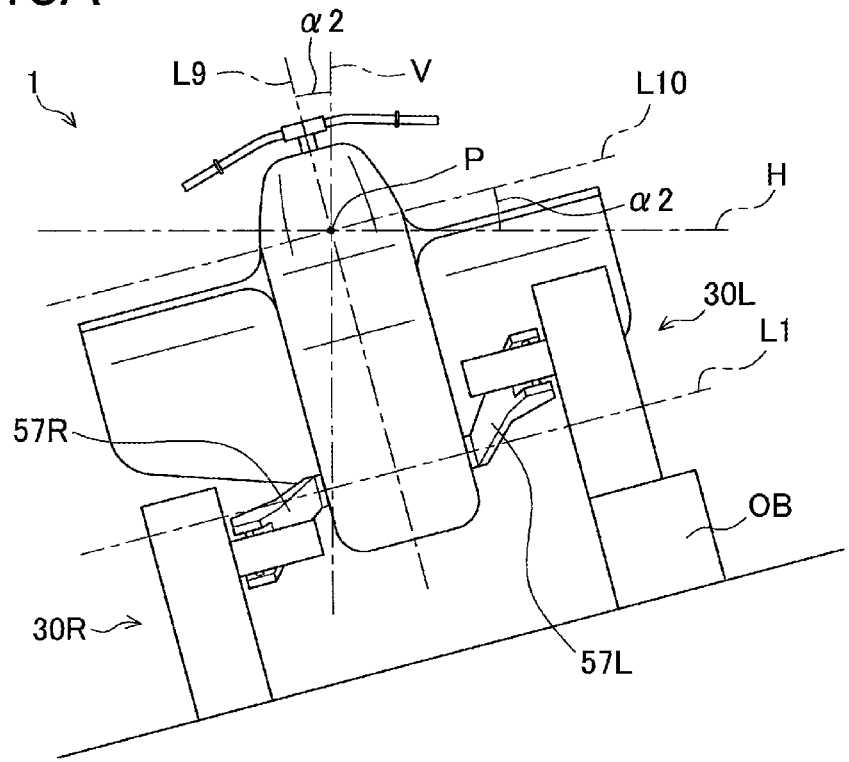
FIG. 18A shows a state where an obstacle is overcome with the attitude of the driver seat surface substantially horizontal.
Figure 18B:
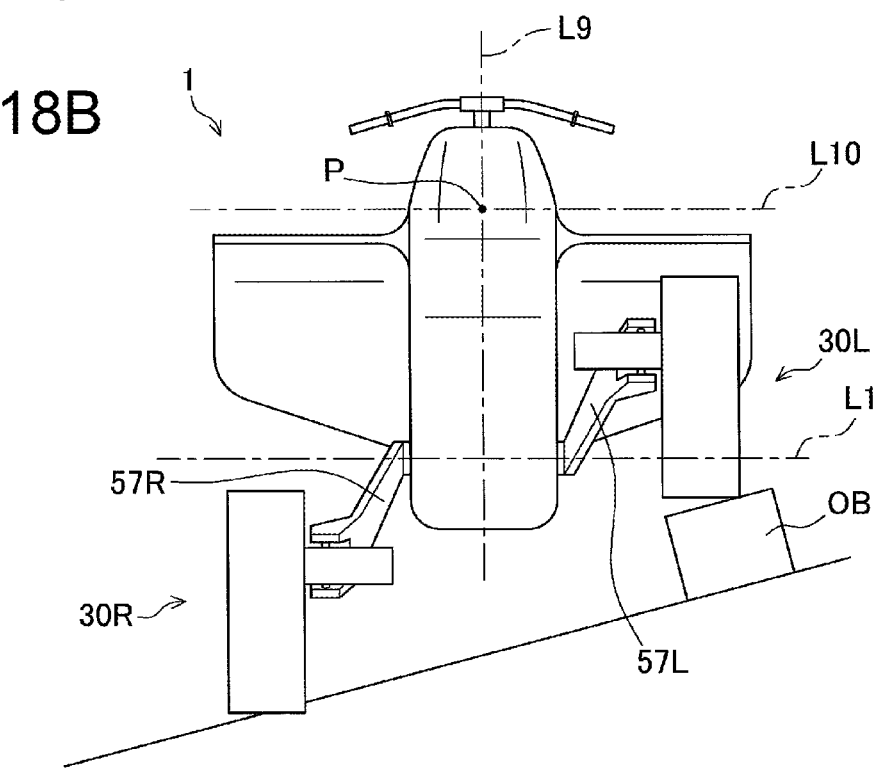
FIG. 18B shows a state where an obstacle is overcome with the attitude of the driver seat surface inclined to the higher side.

The inclination of the driver seat surface 14a to the higher side as shown in FIG. 17B enables an obstacle OB to be overcome by traveling as shown in FIG. 18B without inclining the driver seat surface 14a to the lower side as shown in FIG. 18A, so that the traveling can be made with an improved safety. On a slope ground in a forest or the like, a travelable place is often limited, and sometimes it is impossible to travel with avoidance of the obstacle OB as exemplified by a stump. Thus, for overcoming the obstacle OB, inclining the driver seat surface 14a to the higher side as shown in FIG. 17B in advance is particularly helpful, because it enables the traveling to be made with an improved safety. FIG. 18 is an outline diagram showing another exemplary state when the passenger vehicle 1 is traveling across a slope ground, in which FIG. 18A shows a state where the obstacle OB is overcome with the attitude angle of the driver seat surface 14a substantially horizontal, and FIG. 18B shows a state where the obstacle OB is overcome with the attitude angle of the driver seat surface 14a inclined to the higher side.

Similarly to FIG. 17, FIG. 18A and FIG. 18B are outline diagrams of the passenger vehicle 1 as viewed from the front, with the right side of the drawing being the higher side and the left side of the drawing being the lower side. In FIG. 18A and FIG. 18B, the point P represents the lateral center on the driver seat surface 14a; the angle α2 is the attitude angle of the driver seat surface 14a relative to the horizontal reference plane; the straight line L9 is a straight line perpendicular to the driver seat surface 14a and passing through the point P; the straight line L10 is a straight line parallel to the driver seat surface 14a and passing through the point P; the straight line H is a horizontal straight line passing through the point P; and the straight line V is a vertical straight line passing through the point P.

The attitude angle of the driver seat surface 14a, which has been changed by the first attitude changing operation switch 25 and the second attitude changing operation switch 26 during the automatic control mode, is set as a new target angle in the automatic control mode. Therefore, for example, when traveling in a place where similar slopes intermittently appear or when traveling on the same slope ground over several days, it is not necessary to set the target angle of the driver seat surface 14a to an angle desired by the driver each time. Thus, the passenger vehicle with a good usability can be provided. For example, in a case of a change from the state shown in FIG. 17A to the state shown in FIG. 17B, the target angle of the driver seat surface 14a is changed from zero degrees and set to the angle α1.

Since the target angle changed by the first attitude changing operation switch 25 and the second attitude changing operation switch 26 is associated with ground slope information obtained at a time of the change, the target angle in controlling the attitude of the driver seat surface 14a can be changed to an angle according to the driver's intention. In more detail, the changed target angle is associated not only with its angle value but also with whether the roll direction is toward the higher side or the lower side. Therefore, even when the traveling direction of the passenger vehicle 1 is changed relative to the ground slope direction, the attitude control of, for example, raising the lower-side end of the driver seat surface 14a above the higher-side end of the driver seat surface 14a is enabled. Thus, the passenger vehicle with a good usability can be provided.

For example, when traveling on a slope ground with the left end side of the driver seat surface 14a being the higher side as shown in FIG. 17A, the attitude angle of the driver seat surface 14a is changed so as to be inclined to the higher side (left side) as shown in FIG. 17B. At this time, setting is made such that the value of the target angle is the angle α1 and its direction is toward the higher side. Even if the passenger vehicle 1 is then inverted to travel on the same slope ground with the right end of the driver seat surface 14a being the higher side, the traveling can be made with the inclination to the higher side (right side) by the angle α1, without changing the attitude angle of the driver seat surface 14a again.

A configuration in which the ground slope information includes the ground slope angle enables the attitude control to be performed on the driver seat surface 14a such that the attitude angle converges to the predefined target angle if the ground slope angle is in a predetermined range, for example, equal to or greater than five degrees. This enables the attitude control to be performed on the driver seat surface 14a in accordance with the ground slope information, and the driver need not to select the attitude control mode each time, thus improving the traveling stability and operability.

By an operation performed on the control reset switch 28 serving as the returning operation means, the changed target angle is changed to the predefined initial target angle and the initial ground slope information associated with the initial target angle. Thus, in a case where a plurality of drivers share the passenger vehicle 1, the target angle changed by the previous driver can be easily reset, which can provide a good usability and prevent an erroneous operation and the like.

Next, the attitude control cancellation mode in step S9 will be described. As shown in FIG. 16, the attitude control cancellation mode is started by the driver operating the mode selecting operation switch 27 so as to select the attitude control cancellation mode (step S90). The control unit C stops the motors 52, 92 of the front and rear suspensions 50, 90 (step S91). In step S91, the motors 52, 92 are stopped, and the rotary arms 51, 91 are fixed. That is, the drive shafts of the motors 52, 92 are in a fixed state. Accordingly, the passenger vehicle 1 is in a state where the attitude angle of the driver seat surface 14a relative to the horizontal reference plane is kept as it was when the attitude control cancellation mode was selected. This can prevent the attitude angle of the driver seat surface 14a relative to the horizontal reference plane from being unintentionally changed by the driver at a time of canceling the attitude control.

Then, the control unit C reads detection values of various sensors (step S92). The detection values to be read are the attitude angle of the driver seat surface 14a detected by the attitude angle sensor SE1, the rotation angle of the rotary arm 51 detected by the rotary arm angle sensor SE2, the rotation angle of the left and right swing arms 54 detected by the swing arm angle sensor SE3, the rotation angle of the rotary arm 91 detected by the rotary arm angle sensor SE4, the rotation angle of the left and right swing arms 94 detected by the swing arm angle sensor SE5, and the like. Then, the slope angle calculation part C2 computes the orientation and angle of a ground slope where the passenger vehicle 1 is traveling or stopped, which constitute ground slope information (step S93). The abnormality determination part C3 determines whether or not the ground slope angle of the ground where the passenger vehicle 1 is traveling or stopped is equal to or more than the predefined caution requiring angle which is stored in the main storage device M (step S94). If it is determined that the ground slope angle is equal to or more than the caution requiring angle and there is an abnormality (step S94; YES), the first indicator 19 and the second indicator 20 make a display corresponding to the abnormality state (step S95), and the passenger vehicle 1 discontinues traveling, to stop. If it is determined that the ground slope angle is less than the caution requiring angle and the state is normal (step S94; NO), the processing returns to step S91. Here, step S92 to step S95 are the same as step S51 to step S54 of the manual operation mode and step S71 to step S74 of the automatic control mode described above, and therefore descriptions thereof are omitted.

In this manner, in the attitude control cancellation mode, the motors 52, 92 are stopped, and traveling can be performed in a state where the attitude angle of the driver seat surface 14a relative to the horizontal reference plane is kept as it was when the attitude control cancellation mode was selected.

The attitude control cancellation mode is terminated by the driver operating the mode selecting operation switch 27 so as to change the mode to a mode other than the attitude control cancellation mode, that is, so as to select the manual operation mode or the automatic control mode (step S96).

As for the control of movements of the passenger vehicle 1, in the automatic control mode, the control unit C controls the motors 52, 92 of the front and rear suspensions 50, 90 such that the attitude angle of the driver seat surface 14a relative to the horizontal reference plane converges to the target angle, and controls the motors 52, 92 such that the attitude angle of the driver seat surface 14a is changed preferentially in response to an operation on the first attitude changing operation switch 25 and the second attitude changing operation switch 26 serving as the attitude changing operation means. In the automatic control mode, the target angle change part C1 sets the attitude angle changed by the first attitude changing operation switch 25 and the second attitude changing operation switch 26, as a new target angle in the automatic control mode. This enables the attitude angle of the driver seat surface 14a relative to the horizontal reference plane to be changed in the automatic control mode, and the attitude angle thus changed to be reflected in the next automatic control mode.

The determinations in step S56 and step S79 of whether the rotation angle of the left and right swing arms 54 and the rotation angle of the left and right swing arms 94 are less than the operation limit angle may be performed by using a limit switch. A limit switch that is actuated when the rotation angle becomes equal to or more than the operation limit angle may be provided in each of the swing arms 54, 94, and the determination may be made in accordance with a signal of the limit switch.

The flow of each mode is not limited to the above-described ones. For example, the attitude control cancellation mode and the manual operation mode may be performed such that the attitude angle of the driver seat surface 14*a* relative to the horizontal reference plane returns to the initial attitude which is the initial angle (e.g., zero degrees) in accordance with, for example, detection of the passenger vehicle 1 existing on a flat road based on an operation on a reset switch different from the control reset switch 28 and the control reset switch 28 and detection values of various sensors. Such a configuration allows the driver to return to the initial attitude without feeling anxious.

The passenger vehicle 1 may be further provided with a target angle setting dial separately from the first attitude changing operation switch 25 and the second attitude changing operation switch 26 serving as the attitude changing operation means, the target angle setting dial being configured to set a target angle in the automatic control mode, though illustration with drawings is omitted. The target angle setting dial is, for example, provided near the steering handle 15 and on the upper surface of the coupling member 17*a* so as to be adjacent to the first indicator 19. The target angle setting dial is, for example, configured to make such setting that clockwise turning thereof makes the target angle increase toward the higher side and counterclockwise turning thereof makes the target angle decrease toward the higher side. The target angle setting dial has scale marks for the target angle set in accordance with its turning position. The scale marks have positive/negative, where positive indicates the magnitude of the target angle toward the higher side, and negative indicates the magnitude of the target angle toward the lower side. The target angle setting dial is configured such that its turning position is changed in accordance with a change of the target angle by the first attitude changing operation switch 25 or the second attitude changing operation switch 26 in the automatic control mode.

Since the passenger vehicle 1 has the target angle adjust dial configured in the above-described manner, it is possible to check the target angle in the automatic control mode even in a state where the automatic control mode is not selected. In addition, when the automatic control mode is selected, the driver's unintentional attitude control of the driver seat surface 14*a* to the target angle does not occur, which can provide a good usability and prevent an erroneous operation.

In the passenger vehicle 1 according to this embodiment, it may be acceptable that the attitude control of the driver seat surface 14*a* is not performed, that is, the automatic control mode is not provided, as long as the attitude angle of the driver seat surface 14*a* relative to the horizontal reference plane is changeable. The passenger vehicle 1 is not limited to straddle type passenger vehicles. For example, it may be a passenger vehicle having a cabin in which a driver sits on a seat when riding.

The configurations and the like of the front and rear suspensions 50, 90 are not limited to the above-described configurations. Although the above-described passenger vehicle 1 is configured to change and control the roll angle of a lateral inclination of the driver seat surface 14*a* among attitude angles of the driver seat surface 14*a* relative to the horizontal reference plane, the pitch angle of a longitudinal inclination of the driver seat surface 14*a* or the roll angle and pitch angle of a longitudinal inclination of the driver seat surface 14*a* may be changed and controlled.

Figure 19:
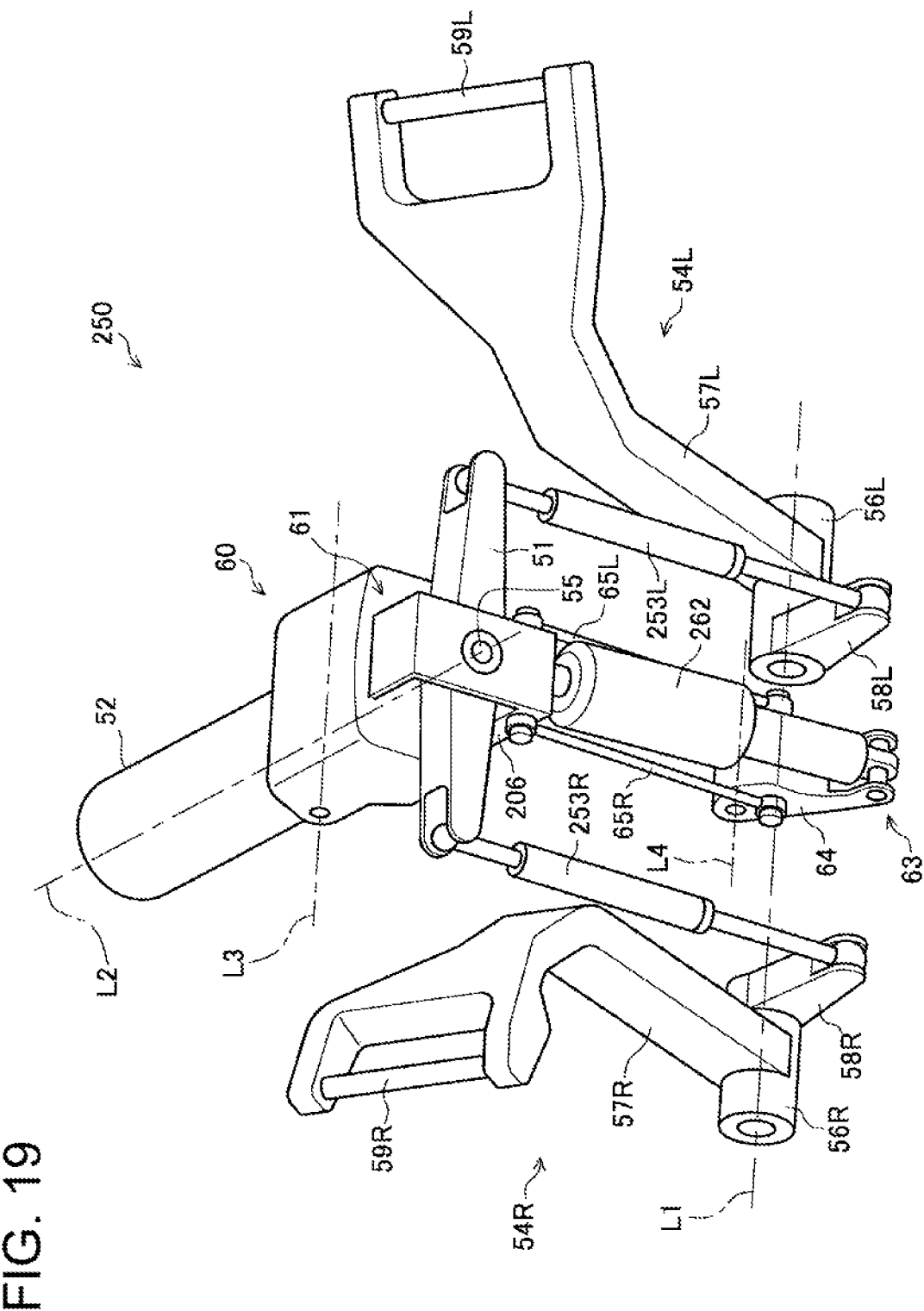
FIG. 19 A perspective view showing an example of a front suspension of a passenger vehicle according to another embodiment.

The configuration for changing and controlling the roll angle and pitch angle is enabled by, for example, changing the configuration of the front and rear suspensions 50, 90. For example, as shown in FIG. 19, in the front suspension 50 described above, a hydraulic cylinder 262 is provided instead of the damper 62, and left and right coupling arms 253R, 253L are provided instead of the left and right coupling arms 53R, 53L. Here, FIG. 19 is a perspective view showing an example of a front suspension 250 of a passenger vehicle according to another embodiment. FIG. 19 is a front perspective view of the front suspension 250 as viewed from obliquely below, similarly to FIG. 5.

The front suspension 250 has the same configuration as that of the front suspension 50 described above, except for the left and right coupling arms 253R, 253L and the hydraulic cylinder 262, and descriptions of parts of the configuration identical to those of the front suspension 50 are omitted as appropriate. The front suspension 250 includes the left and right coupling arms 253R, 253L instead of the left and right coupling arms 53R, 53L of the front suspension 50 described above. Each of the left and right coupling arms 253R, 253L is a rod-like stretchable buffer mechanism made of a cylinder or the like. Similarly to the right coupling arm 53R of the front suspension 50 described above, the right coupling arm 253R has one end thereof coupled to a right end portion of the rotary arm 51 via a ball joint serving as a universal joint, and the other end thereof coupled to the right swing arm 54R via a ball joint serving as a universal joint.

Similarly to the right coupling arm 253R described above, the left coupling arm 253L has one end thereof coupled to a left end portion of the rotary arm 51 via a ball joint serving as a universal joint, and the other end thereof coupled to the left swing arm 54L via a ball joint serving as a universal joint.

Each of the left and right coupling arms 253R, 253L is a rod-like stretchable buffer mechanism made of a cylinder or the like, and the left and right front crawler traveling devices 30R, 30L are suspended from the vehicle body frame 10 via the buffer mechanism. Accordingly, the left and right coupling arms 253R, 253L can buffer an impact occurring between the vehicle body frame 10 and the left and right front crawler traveling devices 30R, 30L.

The front suspension 250 includes the hydraulic cylinder 262 instead of the damper 62 of the front suspension 50 described above, the hydraulic cylinder 262 being constituted of a piston rod, a cylinder liner, and the like. Similarly to the damper 62 of the front suspension 50 described above, the hydraulic cylinder 262 has one end thereof coupled to the bracket 61 so as to be freely rotatable about a lateral axis, and the other end thereof coupled to the rocker arm 64 of the link mechanism 63 so as to be freely rotatable about a lateral axis.

In the passenger vehicle according to another embodiment capable of changing and controlling the roll angle and pitch angle, the rear suspension 90 also includes: a hydraulic cylinder constituted of a piston rod, a cylinder liner, and the like, instead of the damper 102; and left and right coupling arms, each of which is a rod-like stretchable buffer mechanism made of a cylinder or the like, instead of the left and right coupling arms 93R, 93L, though illustration with drawings is omitted.

The passenger vehicle according to another embodiment includes a hydraulic device (not shown) for extending and retracting the hydraulic cylinder 262 of the front suspension 250 and the hydraulic cylinder of the rear suspension. The hydraulic device includes valves such as a switching valve, a relief valve, and a flow regulating valve, and hydraulic elements such as a filter. By the control unit C controlling various valves, the hydraulic cylinder 262 of the front suspension 250 and the hydraulic cylinder of the rear suspension can be extended and retracted. The extension and retraction of the hydraulic cylinder 262 of the front suspension 250 causes the left and right front crawler traveling devices 30R, 30L to integrally swing in the vertical direction, and extension and retraction of the hydraulic cylinder of the rear suspension causes the left and right rear crawler traveling devices 70R, 70L to integrally swing in the vertical direction, thereby changing and controlling the pitch angle of a longitudinal inclination of the driver seat surface 14a.

Figure 20A:
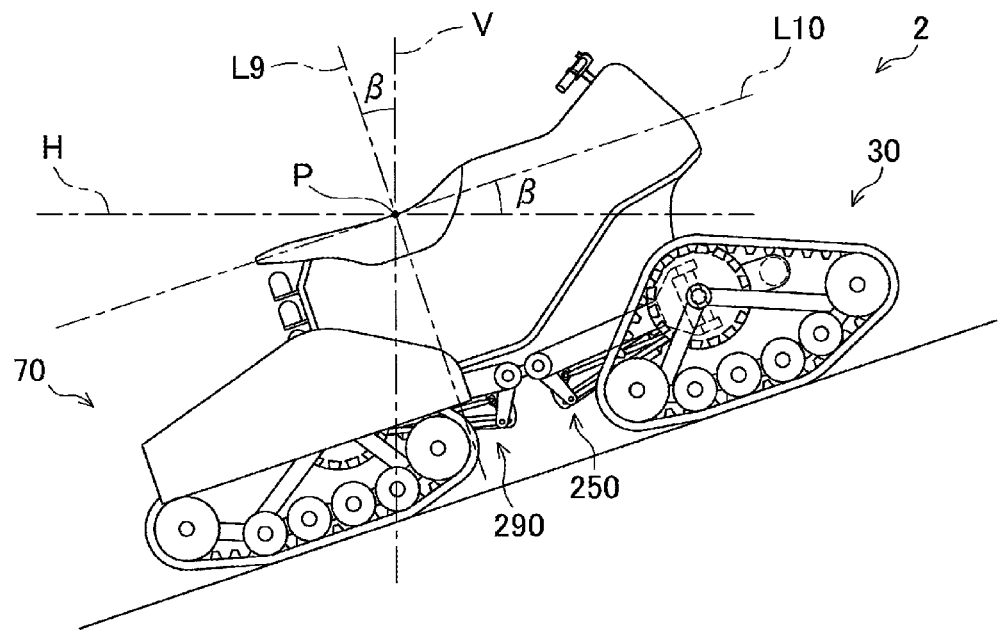
FIG. 20A shows a state before the attitude angle of a driver seat surface is changed.
Figure 20B:
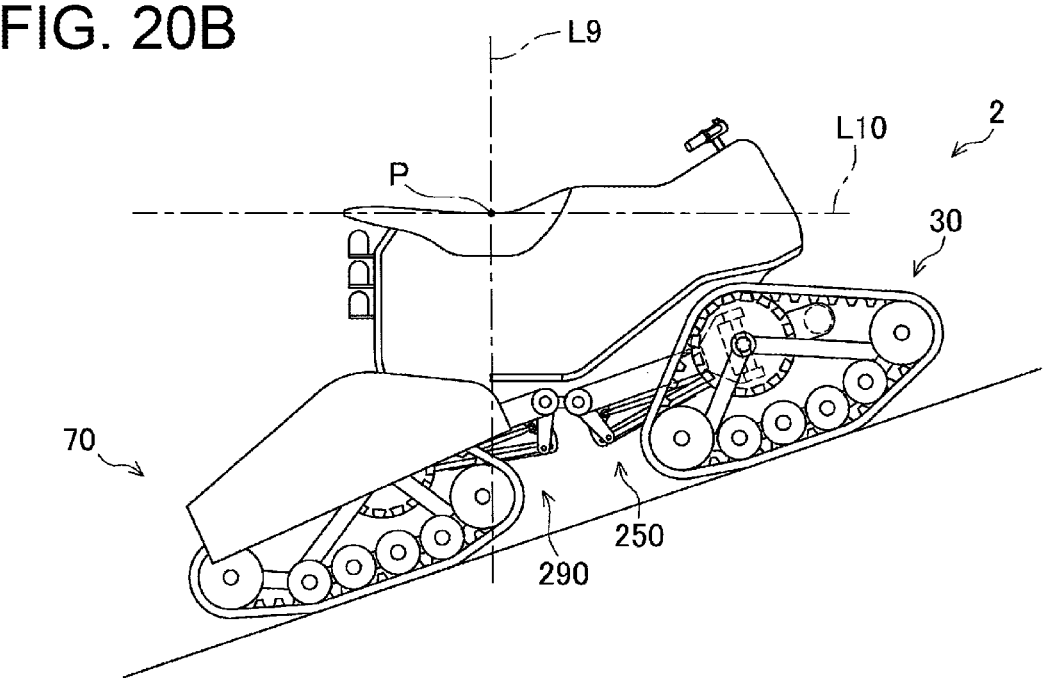
FIG. 20B shows a state after the attitude angle of the driver seat surface is changed.

For example, when traveling uphill such as when climbing up a slope face toward the higher side; from the state shown in FIG. 20A, the hydraulic cylinder 262 of the front suspension 250 is extended so that the left and right front crawler traveling devices 30R, 30L integrally swing upward, and the hydraulic cylinder of the rear suspension is retracted so that the left and right rear crawler traveling devices 70R, 70L integrally swing downward, thereby changing and controlling the attitude angle of the driver seat surface 14a to be horizontal as shown in FIG. 20B. FIG. 20 is an outline diagram showing an exemplary state when a passenger vehicle 2 according to another embodiment is traveling uphill, in which FIG. 20A shows a state before the attitude angle of the driver seat surface 14a is changed, and FIG. 20B shows a state after the attitude angle of the driver seat surface 14a is changed. FIG. 20A and FIG. 20B are outline diagrams of the passenger vehicle 2 according to another embodiment as viewed from a lateral side, with the right side of the drawing being the higher side and the left side of the drawing being the lower side. In FIG. 20A and FIG. 20B, the point P is on the driver seat surface 14a; the angle β is the attitude angle of the driver seat surface 14a relative to the horizontal reference plane; the straight line L9 is a straight line perpendicular to the driver seat surface 14a and passing through the point P; the straight line L10 is a straight line parallel to the driver seat surface 14a and passing through the point P; the straight line H is a horizontal straight line passing through the point P; and the straight line V is a vertical straight line passing through the point P. As described above, the passenger vehicle 2 according to another embodiment is also able to change and control the roll angle of a lateral inclination of the driver seat surface 14a by the motors 52, 92, which can provide the same effects to the pitch angle as the effects obtained in relation to the roll angle described above.

Figure 21:
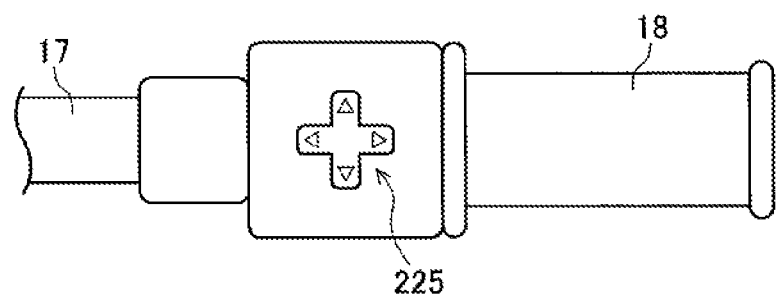
FIG. 21 An outline diagram showing a configuration of a right part of a steering handle of the passenger vehicle according to another embodiment.

The passenger vehicle 2 according to another embodiment capable of changing and controlling the pitch angle of a longitudinal inclination of the driver seat surface 14a is provided with, for example, an attitude changing operation switch 225 as shown in FIG. 21, instead of the first attitude changing operation switch 25 and the second attitude changing operation switch 26 serving as the attitude changing operation means provided in the above-described passenger vehicle 1 capable of changing and controlling the roll angle. FIG. 21 is an outline diagram showing a configuration of a right part of the steering handle 15 of the passenger vehicle 2 according to another embodiment, as viewed from the rear side (driver side).

Provided on the right side of the steering handlebar 17 is the attitude changing operation switch 225 serving as the attitude changing operation means. The attitude changing operation switch 225 is adjacent to the right steering handle grip 18, and provided on the rear side (driver side) of the steering handlebar 17. The attitude changing operation switch 225 is disposed in such a position as to be operable with a right thumb under a state where the steering handle grip 18 is gripped.

The attitude changing operation switch 225 is a seesaw push switch of automatic returning type configured such that its upper, lower, right side, and left side portions can be pushed with its central portion serving as a fulcrum. The attitude changing operation switch 225 is configured such that: when the upper portion is pushed, the attitude angle is changed in such a direction that the front end of the driver seat surface 14a is lowered; when the lower portion is pushed, the attitude angle is changed in such a direction that the rear end of the driver seat surface 14a is lowered; when the right side portion is pushed, the attitude angle is changed in such a direction that the right end of the driver seat surface 14a is lowered; and when the left side portion is pushed, the attitude angle is changed in such a direction that the left end of the driver seat surface 14a is lowered.

Accordingly, the passenger vehicle 2 according to another embodiment provides the same effects as those of the passenger vehicle 1 described above, and enables the driver to operate the attitude changing operation switch 225 serving as the attitude changing operation means without releasing his/her hand from the steering handle 15, so that the attitude angle of the driver seat surface 14a can be changed safely and easily without a deterioration in the driving operability. Since the attitude angle of the driver seat surface 14a is changed in such a direction that the end side corresponding to a pushed portion of the attitude changing operation switch 225 is lowered, the change of the attitude angle of the driver seat surface 14a can be adapted to the driver's perception. In addition, the attitude changing operation switch 225 allows the attitude angle (the roll angle and pitch angle) of the driver seat surface 14a relative to the horizontal reference plane to be changed even in the automatic control mode.

The attitude changing operation switch 225 serving as the attitude changing operation means is not limited to the above-described configuration, as long as it is configured to be operable with a thumb under the state where the steering handle grip 18 is gripped. The type, arrangement, and the like, of the switch can be designed as appropriate. Although the above-described attitude changing operation switch 225 is disposed on the rear side of the steering handlebar 17, it may be disposed on the upper side of the steering handlebar 17. In a case where the attitude changing operation switch 225 is disposed in such a position, from the viewpoint of operability, it is preferable that the attitude changing operation switch 225 is configured such that: when its front portion is pushed, the attitude angle is changed in such a direction that the front end of the driver seat surface 14a is lowered; when its rear portion is pushed, the attitude angle is changed in such a direction that the rear end of the driver seat surface 14a is lowered; when its right side portion is pushed, the attitude angle is changed in such a direction that the right end of the driver seat surface 14a is lowered; and when its left side portion is pushed, the attitude angle is changed in such a direction that the left end of the driver seat surface 14a is lowered. This enables the change of the attitude angle of the driver seat surface 14a to be adapted to the driver's perception.

The attitude changing operation switch 225 serving as the attitude changing operation means may separately include a switch for changing the roll angle of a lateral inclination of the driver seat surface 14a and a switch for changing the pitch angle of a longitudinal inclination of the driver seat surface 14a.

Figure 22:
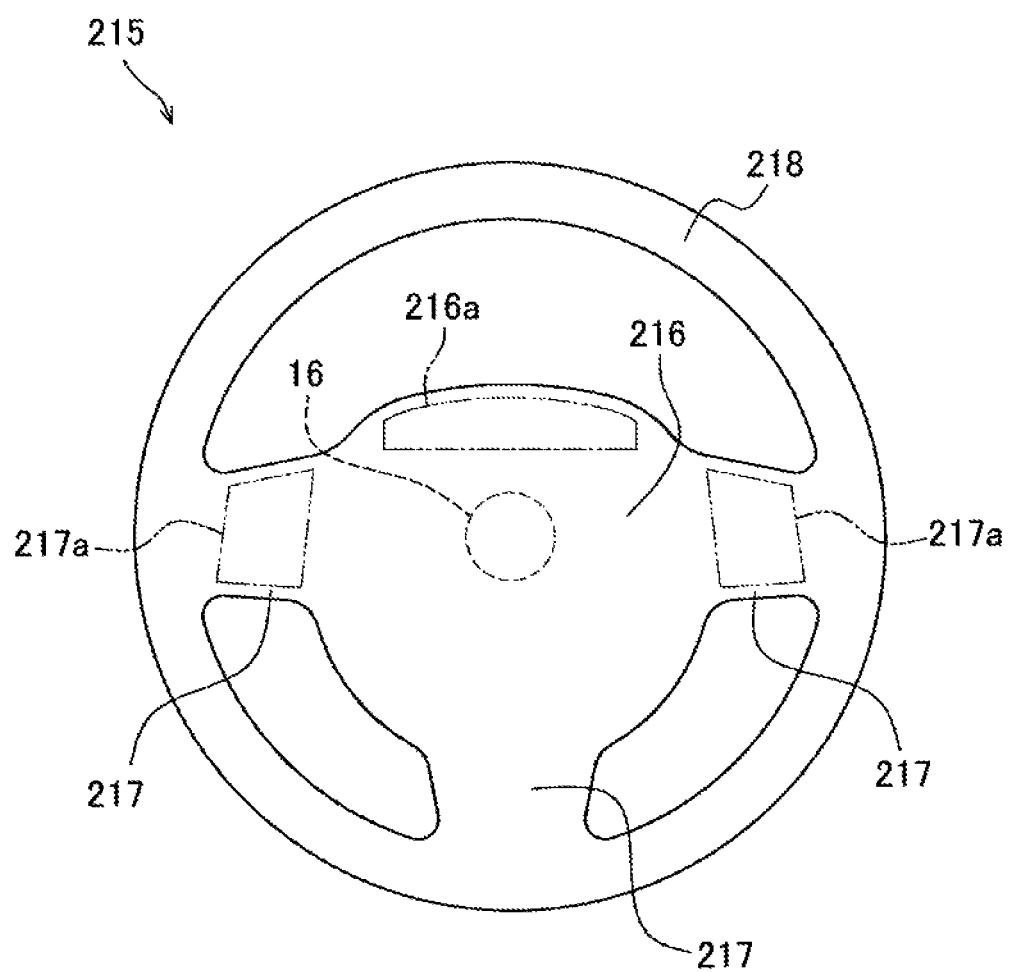
FIG. 22 An outline diagram showing a variation of the steering handle.

The steering handle 15 serving as the steering means is not limited to the above-described configuration, as long as it includes a gripper to be gripped by a driver. For example, as shown in FIG. 22, the steering handle 15 may include an annular rim part 218, a center cover 216 disposed in a central area of the rim part 218 and coupled to the steering shaft 16, a spoke part 217 that couples the rim part 218 and the center cover 216 to each other, and the like. FIG. 22 is an outline diagram showing a variation of the steering handle 15, as viewed from above.

A steering handle 215 according to the variation is operated with the rim part 218 gripped by a driver. In the steering handle 215 having such a configuration, it is preferable that the first attitude changing operation switch 25, the second attitude changing operation switch 26, and the attitude changing operation switch 225 serving as the attitude changing operation means, the control mode selecting operation switch 27 serving as the mode selecting operation means, and the like, are disposed in such a position as to be operable with a thumb under a state where the rim part 218 is gripped, and preferably, they are disposed in regions 217a of the spoke part 217 on the upper surface side, which are adjacent to the rim part 218. It is preferable that the first indicator 19 is provided in a region 216a of the center cover 216 on the upper surface side. This configuration enables the steering handle 215 including the annular rim part 218 serving as a gripper to provide the same effects as those of the steering handle 15 described above.

The present invention is not limited to the examples described above, and may be embodied by any aspects without departing from the principles of the invention.

INDUSTRIAL APPLICABILITY

The passenger vehicle of the present invention is not particularly limited, and applicable to any passenger vehicles including, for example, work vehicles for working on uneven ground such as tractors, combine harvesters, transplanters, construction machines, and forestry machines, transport vehicles such as forklifts, and automobiles.

REFERENCE SIGNS LIST 1, 2 passenger vehicle
14 driver seat
14a driver seat surface
15, 215 steering handle (steering means)
18 steering handle grip (gripper)
19 first indicator (indicator)
20 second indicator (indicator)
25 first attitude changing operation switch (attitude changing operation means)
26 second attitude changing operation switch (attitude changing operation means)
27 mode selecting operation switch (mode selecting operation means)
28 control reset switch (returning operation means)
218 rim part (gripper)
C control unit
C1 target angle change part
C2 slope angle calculation part
C3 abnormality determination part
C4 operation determination part
M main storage device
SE1 attitude angle sensor
SE2 front suspension rotary arm angle sensor
SE3 front suspension swing arm angle sensor
SE4 rear suspension rotary arm angle sensor
SE5 rear suspension swing arm angle sensor

The invention claimed is:

1. A passenger vehicle provided with steering means having a gripper that is configured to be gripped by a driver, the passenger vehicle being configured such that an attitude angle of a surface of a driver seat relative to a horizontal reference plane is changeable, the passenger vehicle comprising:
   attitude changing operation means for changing the attitude angle, the attitude changing operation means coupled to the gripper of the steering means, adjacent to the gripper of the steering means, positioned between the steering means and the driver seat, and disposed in such a position as to be operable with a thumb from the gripper; and
   a mode selecting operation means for selecting one mode from a plurality of modes including:
      an automatic control mode in which the attitude angle is controlled so as to converge to a predefined target angle corresponding to an inclination of a ground surface; and
      a manual operation mode in which the attitude angle is changed by the attitude changing operation means; and
   a lever coupled to the steering means; and
   wherein the attitude changing operation means is configured to change the attitude angle in priority to the automatic control mode even when the automatic control mode is selected by the mode selecting operation means.

2. The passenger vehicle according to claim 1, wherein:
   the attitude changing operation means comprises a right hand attitude changing operation means and a left hand attitude changing operation means,
   the attitude changing operation means is a push switch, and the right hand attitude changing operation means and the left hand attitude changing operation means are separately provided, and
   when the right hand attitude changing operation means switch is pushed, the attitude changing operation means changes the attitude angle in such a direction that a right end of the driver seat surface is lowered, and
   when the left hand attitude changing operation means switch is pushed, the attitude changing operation means changes the attitude angle in such a direction that a left end of the driver seat surface is lowered.

3. The passenger vehicle according to claim 1, wherein:
   the attitude changing operation means is a seesaw push switch configured to:
      when a right side portion thereof is pushed, change the attitude angle in such a direction that a right end of the driver seat surface is lowered, and
      when a left side portion thereof is pushed, change the attitude angle in such a direction that a left end of the driver seat surface is lowered.

4. The passenger vehicle according to claim 1, wherein:
   the attitude changing operation means is a seesaw push switch configured to:
      when a front or upper portion thereof is pushed, change the attitude angle in such a direction that a front end of the driver seat surface is lowered, and when a rear or lower portion thereof is pushed, change the attitude angle in such a direction that a rear end of the driver seat surface is lowered.

5. The passenger vehicle according to claim 1, wherein:
the attitude changing operation means is configured to adjust a height of a right side or a left side of the driver seat.

6. The passenger vehicle according to claim 1, wherein:
the attitude changing operation means comprises a first attitude changing operation means and a second attitude changing operation means that is distinct from the first attitude changing operation means.

7. The passenger vehicle according to claim 6, wherein:
the first attitude changing operation means is positioned on a first hand gripper; and
the second attitude changing operation means is positioned on a second hand gripper.

8. The passenger vehicle according to claim 6, wherein:
the first attitude changing operation means is configured to adjust a height of a right side of the driver seat; and
the second attitude changing operation means is configured to adjust a height of a left side of the driver seat.

9. The passenger vehicle according to claim 1, further comprising:
a steering handle comprising the attitude changing operation means positioned such that, when a hand is grasped to the steering handle at a first griper location, the attitude changing operation means is operable via the thumb of the hand.

10. The passenger vehicle according to claim 1, wherein:
the predefined target angle is a preset, single value; and
the predefined target angle is adjustable via a user input.

11. An apparatus comprising:
a vehicle frame;
a seat coupled to the vehicle frame;
a steering handle comprising a first gripper location; and
a switch coupled to the first gripper of the steering handle, adjacent to the first gripper of the steering handle, and positioned between the steering handle and the seat of a vehicle frame such that when a hand is grasped to the steering handle at the first gripper location, the switch is operable via a thumb of the hand;
a lever coupled to the steering handle; and
a suspension system coupled to the vehicle frame and configured to be actuated via a motor to adjust an angle of the vehicle frame relative to a horizon plane; and
wherein:
the suspension system is configured to cause the angle of the vehicle frame relative to the horizon plane to converge to a predefined angle based on the switch being in a first state, the predefined angle corresponding to an inclination of a ground surface via which the vehicle frame travels; and
the suspension system is configured to cause the angle of the vehicle frame relative to the horizon plane to change based on the switch being in a second state.

12. The apparatus according to claim 11, wherein:
the switch is configured to receive an input; and
the input corresponds with a plurality of states of the switch.

13. The apparatus according to claim 11, wherein:
the suspension system comprises:
a rotary arm coupled to the motor and configured to be rotated;
a plurality of coupling arms coupled to the rotary arm; and
a plurality of swing arms coupled to the plurality of coupling arms and the vehicle frame.

14. The apparatus according to claim 11 wherein:
the suspension system comprises a plurality of suspension systems; and
the motor comprises a plurality of motors.

15. The apparatus according to claim 11, further comprising:
a second switch configured to receive a second input, the second input to the second switch including instructions to operate in an automatic mode and a manual mode; and
wherein:
the suspension system is configured to cause the angle of the vehicle frame relative to the horizon plane to converge to a predefined angle based on the switch being in a first state and the second switch being in a state corresponding with the automatic mode; and
the suspension system is configured to cause the angle of the vehicle frame relative to the horizon plane to adjust via the switch based on the second switch being in a state corresponding with the manual mode.

16. The apparatus according to claim 11, wherein:
the switch comprises a third switch and a fourth switch that is distinct from the third switch;
the third switch is configured to adjust a height of a right side of the vehicle frame;
the fourth switch is configured to adjust a height of a left side of the vehicle frame;
the steering handle comprises a first hand gripper and a second hand gripper;
the third switch is positioned on the first hand gripper; and
the fourth switch is positioned on the second hand gripper.

17. The apparatus according to claim 11, further comprising:
a processor and a memory; and
wherein:
the processor is configured to:
determine a state of the switch;
cause the suspension system to change the angle of the vehicle frame relative to the horizon plane based on the determined state of the switch;
detect an input from a second switch; and
cause a vertical position of a right side or a left side of the vehicle frame to adjust based on detection of the input from the second switch.

18. The passenger vehicle according to claim 1, wherein:
the lever is configured to actuate a vehicle brake;
the lever is positioned on a front side of the steering means;
the attitude chaining operation means is positioned on a rear side of steering means; and
the attitude changing operation means is interposed between the lever and the driver seat.

19. The passenger vehicle according to claim 1, wherein:
the steering means is coupled to a vehicle frame via a bracket;
the gripper includes a first end and a second end that is opposite the first end, the first end closer to the bracket than the second end; and
the attitude changing operation means is positioned between the bracket and the first end of the gripper.

20. The apparatus according to claim 11, wherein:
the lever is configured to actuate a vehicle brake;
the lever is positioned on a front side of the steering handle;
the switch is positioned on a rear side of steering handle;

the switch is interposed between the lever and the seat of the vehicle frame;
the steering handle includes a handlebar coupled to the vehicle frame via a bracket; and
an entirety of the switch is positioned between the bracket and the first gripper location.

* * * * *